US012052124B2

(12) United States Patent
Yoon

(10) Patent No.: US 12,052,124 B2
(45) Date of Patent: Jul. 30, 2024

(54) METHOD AND APPARATUS FOR CONFIGURING DMRS IN WIRELESS COMMUNICATION SYSTEM

(71) Applicant: Innovative Technology Lab Co., Ltd., Seoul (KR)

(72) Inventor: Sung Jun Yoon, Seoul (KR)

(73) Assignee: INNOVATIVE TECHNOLOGY LAB CO., LTD., Seoul (KR)

(*) Notice: Subject to any disclaimer, the term of this patent is extended or adjusted under 35 U.S.C. 154(b) by 725 days.

(21) Appl. No.: 17/242,619

(22) Filed: Apr. 28, 2021

(65) Prior Publication Data

US 2021/0250912 A1 Aug. 12, 2021

Related U.S. Application Data

(63) Continuation of application No. PCT/KR2020/000341, filed on Jan. 8, 2020.

(30) Foreign Application Priority Data

Jan. 11, 2019 (KR) ........................ 10-2019-0004205

(51) Int. Cl.
H04L 27/26 (2006.01)
H04B 7/0452 (2017.01)
H04L 5/00 (2006.01)
H04W 4/40 (2018.01)
H04W 72/02 (2009.01)
H04W 72/0446 (2023.01)
H04W 72/0453 (2023.01)
H04W 72/1263 (2023.01)
(Continued)

(52) U.S. Cl.
CPC ........ *H04L 27/2613* (2013.01); *H04L 5/0051* (2013.01); *H04W 4/40* (2018.02); *H04W 72/02* (2013.01); *H04W 72/0446* (2013.01); *H04W 72/0453* (2013.01); *H04W 72/1263* (2013.01); *H04W 72/20* (2023.01); *H04W 76/14* (2018.02); *H04B 7/0452* (2013.01); *H04L 5/0007* (2013.01)

(58) Field of Classification Search
CPC ... H04B 7/0452; H04L 5/0007; H04L 5/0051; H04L 27/2613; H04W 4/40; H04W 72/0446; H04W 72/453; H04W 72/1262; H04W 72/20; H04W 76/14
See application file for complete search history.

(56) References Cited

U.S. PATENT DOCUMENTS

2016/0345312 A1 11/2016 Kim et al.
2018/0007529 A1 1/2018 Shin et al.
(Continued)

OTHER PUBLICATIONS

MediaTek Inc., "On NR V2X Physical Channel Design Issues", 3GPP TSG RAN WG1 Meeting #94 R1-1808280, Gothenburg, Sweden, Aug. 20-24, 2018, pp. 1-5.
(Continued)

*Primary Examiner* — Brian P Cox

(57) ABSTRACT

A communication method of a terminal with another terminal through a sidelink may provide information related to a demodulation reference signal (DMRS). A user device may demodulate a Physical Sidelink Control Channel (PSCCH) DMRS and a Physical Sidelink Shared Channel (PSSCH) DMRS, and may demodulate a PSCCH based on the demodulated PSCCH DMRS and demodulate a PSSCH based on the demodulated PSSCH DMRS.

21 Claims, 17 Drawing Sheets

(51) Int. Cl.
  *H04W 72/20* (2023.01)
  *H04W 76/14* (2018.01)

(56) References Cited

U.S. PATENT DOCUMENTS

| | | | |
|---|---|---|---|
| 2018/0048446 A1* | 2/2018 | Jiang | H04W 72/21 |
| 2018/0167184 A1 | 6/2018 | Zhou et al. | |
| 2018/0212733 A1 | 7/2018 | Khoryaev et al. | |
| 2018/0241508 A1 | 8/2018 | Chervyakov et al. | |
| 2020/0275458 A1* | 8/2020 | Khoryaev | H04W 72/12 |
| 2021/0273763 A1* | 9/2021 | Wang | H04L 5/0051 |

OTHER PUBLICATIONS

Examination report under sections 12 & 13 of the Patents Act, 1970 and the Patents Rules, 2003 for Application No. 202117035205, from Intellectual Property India. Dated Aug. 12, 2022.

Extended European Search report for Application No. 20738741. 6-1213 / 3910850 PCT/KR2020000341. Dated Sep. 9, 2022.
"3rd Generation Partnership Project; Technical Specification Group Radio Access Network; Evolved Universal Terrestrial Radio Access (E-UTRA); Physical channels and modulation (Release 14)," 3GPP TS 36.211 V14.8.0, Sep. 2018, pp. 1-198, 3GPP.
"3rd Generation Partnership Project; Technical Specification Group Radio Access Network; NR; Physical channels and modulation (Release 15)," 3GPP TS 38.211 V15.3.0. Sep. 2018, pp. 1-99, 3GPP.
"3rd Generation Partnership Project; Technical Specification Group Radio Access Network; NR; Physical layer procedures for data (Release 15)," 3GPP TS 38.214 V15.3.0, Sep. 2018, pp. 1-96, 3GPP.
International Search Report (PCT/KR2020/000341). May 1, 2020.
Written Opinion of the International Searching Authority (PCT/KR2020/000341).
Samsung, "DMRS Configuration for PSSCH and PSCCH", R1-164754, 3GPP TSG RAN WG1 Meeting #85, Nanjing, May 2016, pp. 1-3, 3GPP.

* cited by examiner

Fig. 1
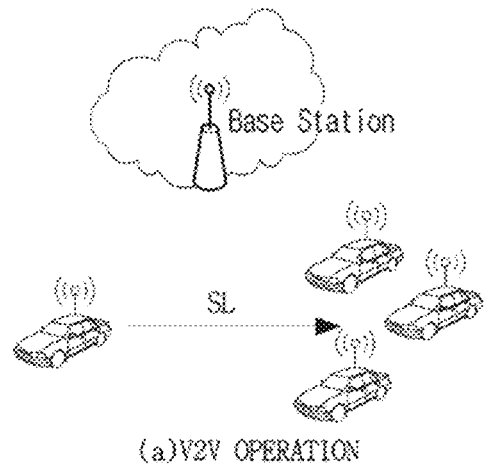
(a) V2V OPERATION
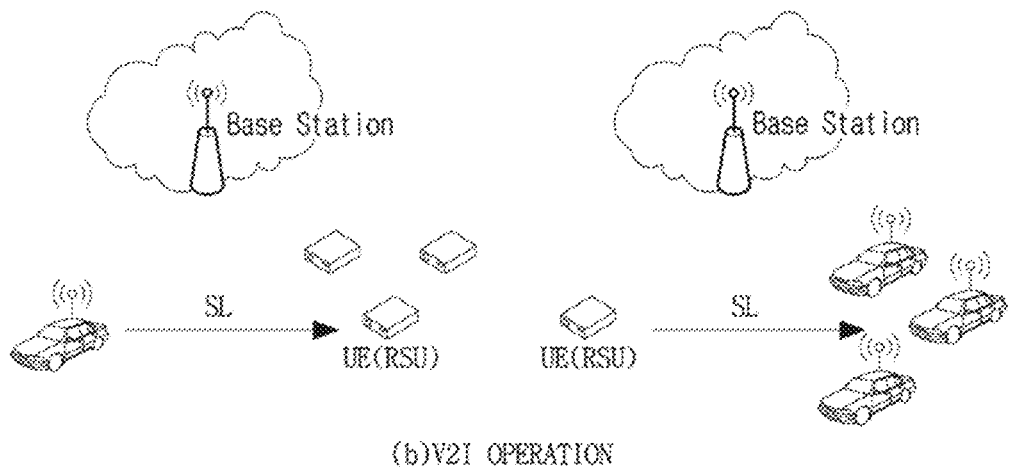
(b) V2I OPERATION
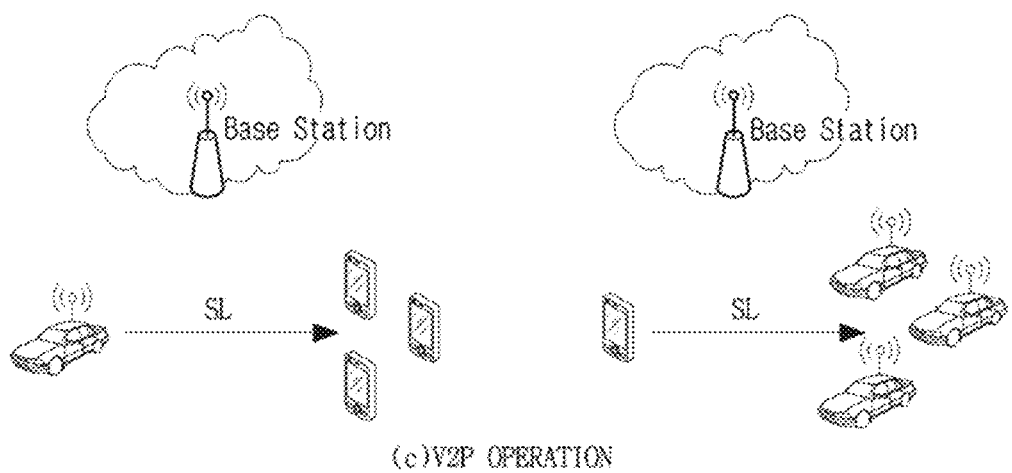
(c) V2P OPERATION Fig. 2
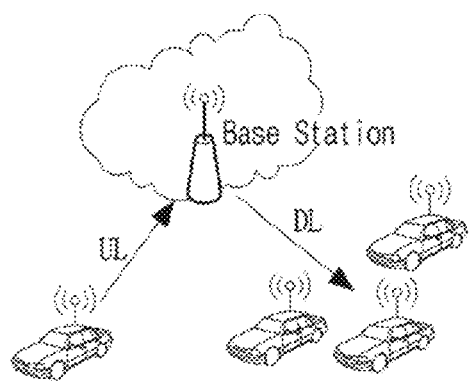
(a) V2V OPERATION
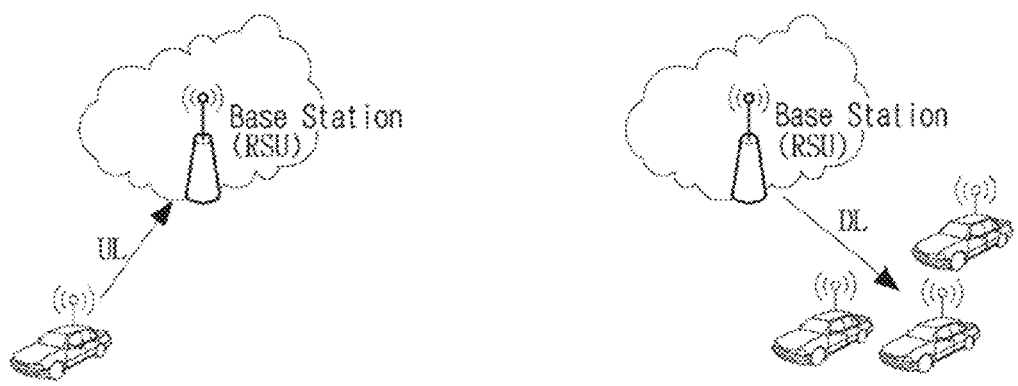
(b) V2I OPERATION
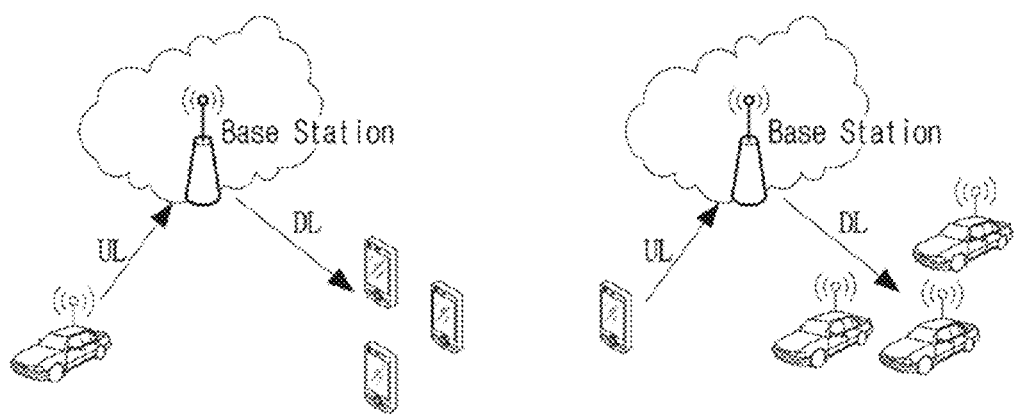
(c) V2P OPERATION Fig. 3
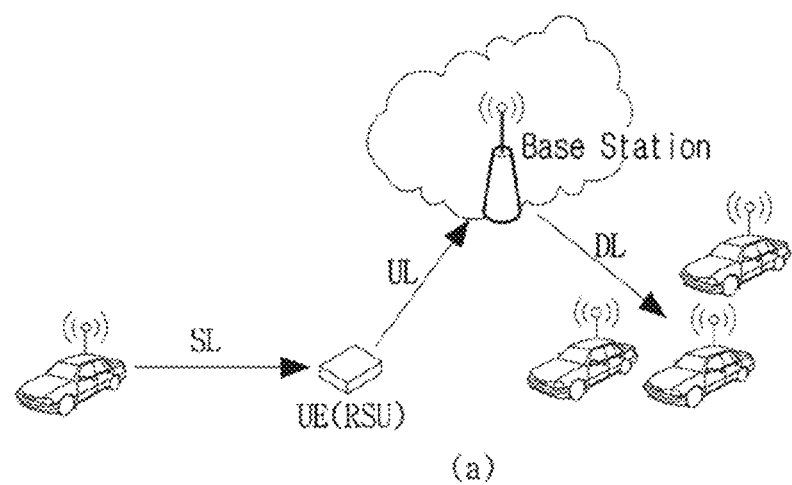
(a)
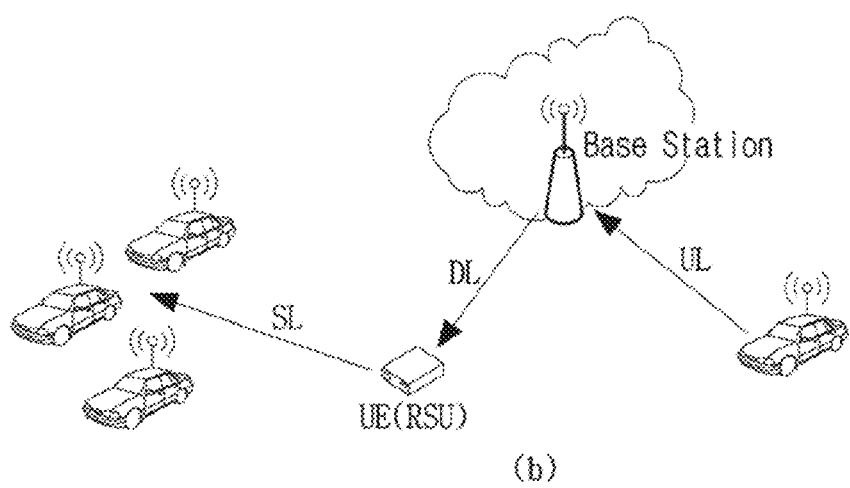
(b)

Fig. 9
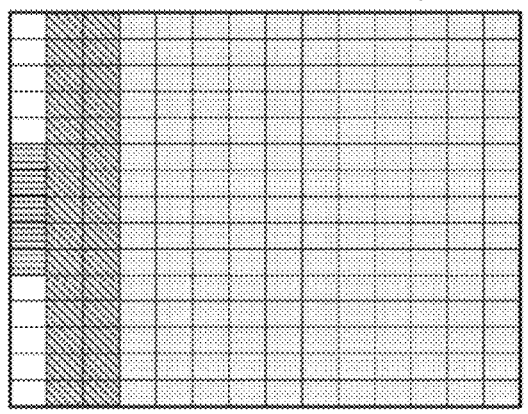
(A) PSCCH/PSSCH allocation type#1
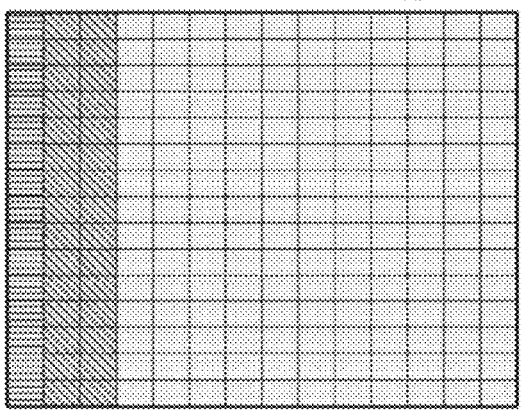
(B) PSCCH/PSSCH allocation type#2
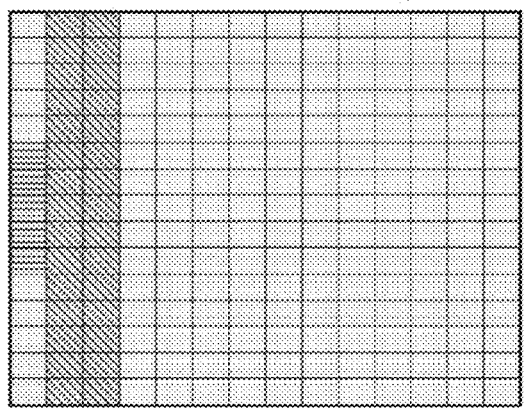
(C) PSCCH/PSSCH allocation type#3-1
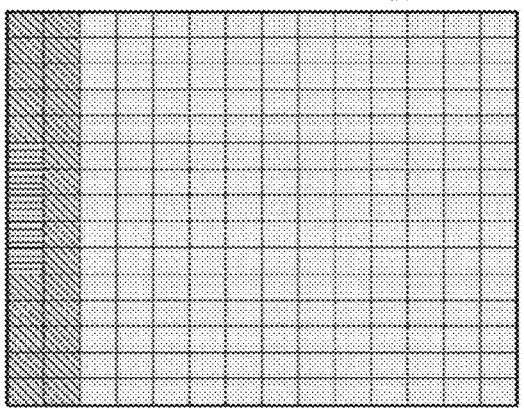
(D) PSCCH/PSSCH allocation type#3-2
- PSCCH and PSCCH DMRS(1PRB and 1 symbol)
- PSSCH and PSSCH DMRS(1PRB and 1 symbol)
- PSSCH and/or Others(1PRB and 1 symbol)

Fig. 11
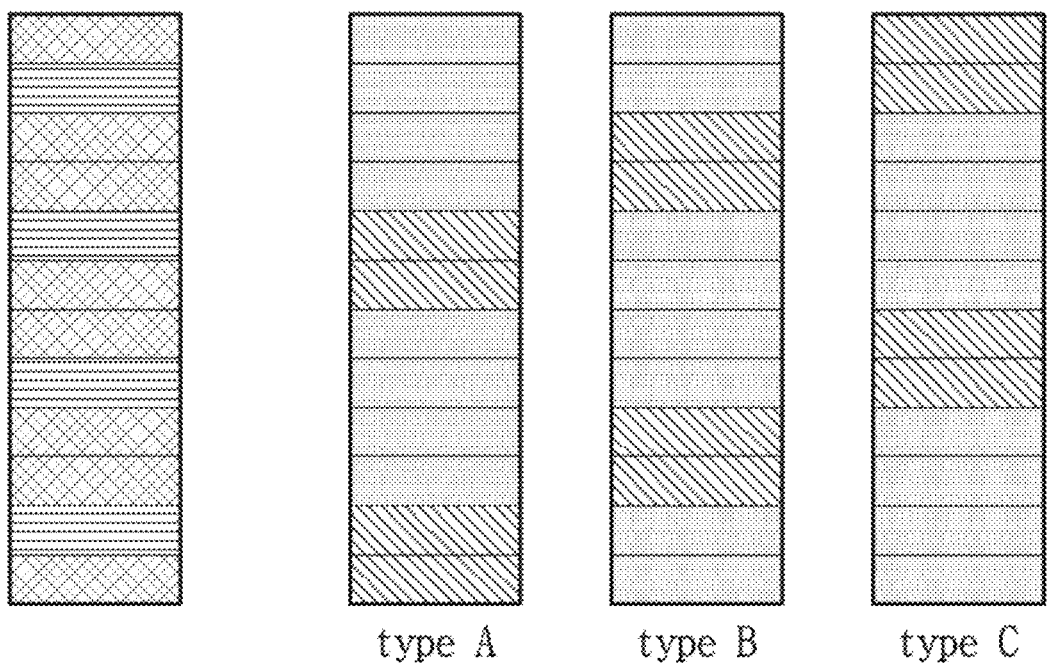
type A     type B     type C
 PSCCH DMRS (1 sub carrier and 1 symbol)
 PSSCH DMRS (1 sub carrier and 1 symbol)
 PSCCH (1 sub carrier and 1 symbol)
 PSSCH (1 sub carrier and 1 symbol)

type A     type B     type C

PSCCH DMRS (1 sub carrier and 1 symbol)

PSSCH DMRS (1 sub carrier and 1 symbol)

PSCCH (1 sub carrier and 1 symbol)

PSSCH (1 sub carrier and 1 symbol)

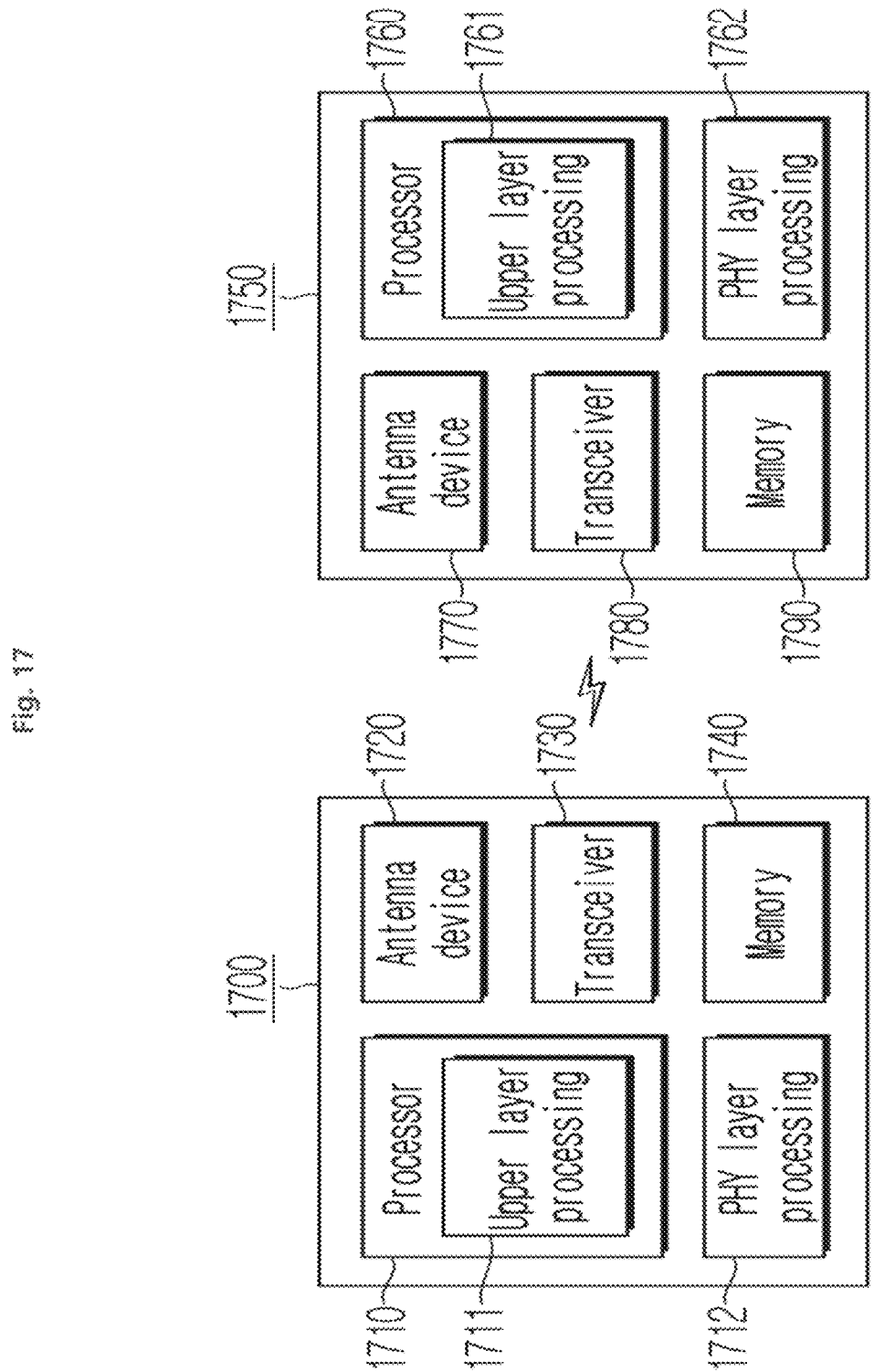

METHOD AND APPARATUS FOR CONFIGURING DMRS IN WIRELESS COMMUNICATION SYSTEM

CROSS-REFERENCE TO RELATED APPLICATIONS

This application is a continuation of PCT International patent application No. PCT/KR2020/000341, filed on Jan. 8, 2020, which claims priority from and the benefit of Korean Patent Application No. 10-2019-0004205, filed on Jan. 11, 2019, each of which is hereby incorporated by reference in its entirety.

BACKGROUND

1. Field

The present disclosure relates to a method and apparatus for configuring a demodulation reference signal (DMRS) for a terminal that supports vehicle-to-everything (V2X) communication in a wireless communication system, and more particularly, to a method and apparatus for configuring a DMRS for V2X communication in a new radio (NR) system.

2. Discussion of the Background

International Mobile Telecommunication (IMT) framework and standard are being developed in the International Telecommunication Union (ITU). Also, in the recent times, discussion for 5-th generation (5G) communication is ongoing through a program called "IMT for 2020 and beyond".

To meet the requirements requested by "IMT for 2020 and beyond", discussion is being made to support various numerologies about a time-frequency resource unit standard by considering various scenarios, service requirements, and potential system compatibility in a 3-rd Generation Partnership Project (3GPP) new radio (NR) system.

SUMMARY

An aspect of the present disclosure provides a method and apparatus for configuring a demodulation reference signal (DMRS) for a terminal supporting vehicle-to-everything (V2X) communication in a wireless communication system, and more particularly, provides a method and apparatus for indicating DMRS related information for V2X communication.

An aspect of the present disclosure also provides a method and apparatus for configuring a DMRS for new radio (NR) V2X communication in a wireless communication system.

An aspect of the present disclosure also provides a method and apparatus for configuring a DMRS by considering a resource allocation structure in which a Physical Sidelink Control Channel (PSCCH) and a Physical Sidelink Shared Channel (PSSCH) are simultaneously present in at least one symbol in a wireless communication system.

An aspect of the present disclosure also provides a method and apparatus for effectively using resources by considering a resource allocation structure in which a PSCCH and a PSSCH are simultaneously present in at least one symbol in a wireless communication system.

An aspect of the present disclosure also provides a method and apparatus for quickly demodulating data by considering a resource allocation structure in which a PSCCH and a PSSCH are simultaneously present in at least one symbol in a wireless communication system.

According to an aspect of the present disclosure, there is provided a communication method of a terminal with another terminal through a sidelink. The communication method may include acquiring information related to a demodulation reference signal (DMRS); simultaneously demodulating a Physical Sidelink Control Channel (PSCCH) DMRS and a Physical Sidelink Shared Channel (PSSCH) DMRS; and demodulating a PSCCH based on the demodulated PSCCH DMRS and demodulating a PSSCH based on the demodulated PSCCH DMRS and PSSCH DMRS.

The features briefly abstracted above with respect to the present disclosure are merely aspects of the detailed description of this disclosure and are not provided to limit the scope of the disclosure.

According to the present disclosure, it is possible to configure a demodulation reference signal (DMRS) for a terminal supporting vehicle-to-everything (V2X) communication in a wireless communication system, and more particularly, to indicate DMRS related information for V2X communication.

According to the present disclosure, it is possible to configure a DMRS for new radio (NR) V2X communication in a wireless communication system.

According to the present disclosure, it is possible to configure a DMRS by considering a resource allocation structure in which a Physical Sidelink Control Channel (PSCCH) and a Physical Sidelink Shared Channel (PSSCH) are simultaneously present in at least one symbol in a wireless communication system.

According to the present disclosure, it is possible to effectively use resources by considering a resource allocation structure in which a PSCCH and a PSSCH are simultaneously present in at least one single symbol in a wireless communication system.

According to the present disclosure, it is possible to quickly demodulate data by considering a resource allocation structure in which a PSCCH and a PSSCH are simultaneously present in at least one single symbol in a wireless communication system.

Effects achievable from the present disclosure are not limited to the aforementioned effects and still other effects not described herein may be clearly understood by one of ordinary skill in the art to which the present disclosure pertains from the following description.

BRIEF DESCRIPTION OF DRAWINGS

FIG. 1 illustrates an example of describing a vehicle-to-everything (V2X) scenario according to the present disclosure;

FIG. 2 illustrates an example of describing a vehicle-to-everything (V2X) scenario according to the present disclosure;

FIG. 3 illustrates an example of describing a vehicle-to-everything (V2X) scenario according to the present disclosure;

FIG. 9 illustrates an example of a method of allocating a PSCCH and a PSSCH according to the present disclosure;

FIG. 11 illustrates an example of a PSCCH DMRS allocation pattern and a PSSCH DMRS allocation pattern according to the present disclosure.

FIG. 17 is a diagram illustrating a configuration of a base station device and a terminal device according to the present disclosure.

DETAILED DESCRIPTION OF THE ILLUSTRATED EMBODIMENTS

Figure 4:
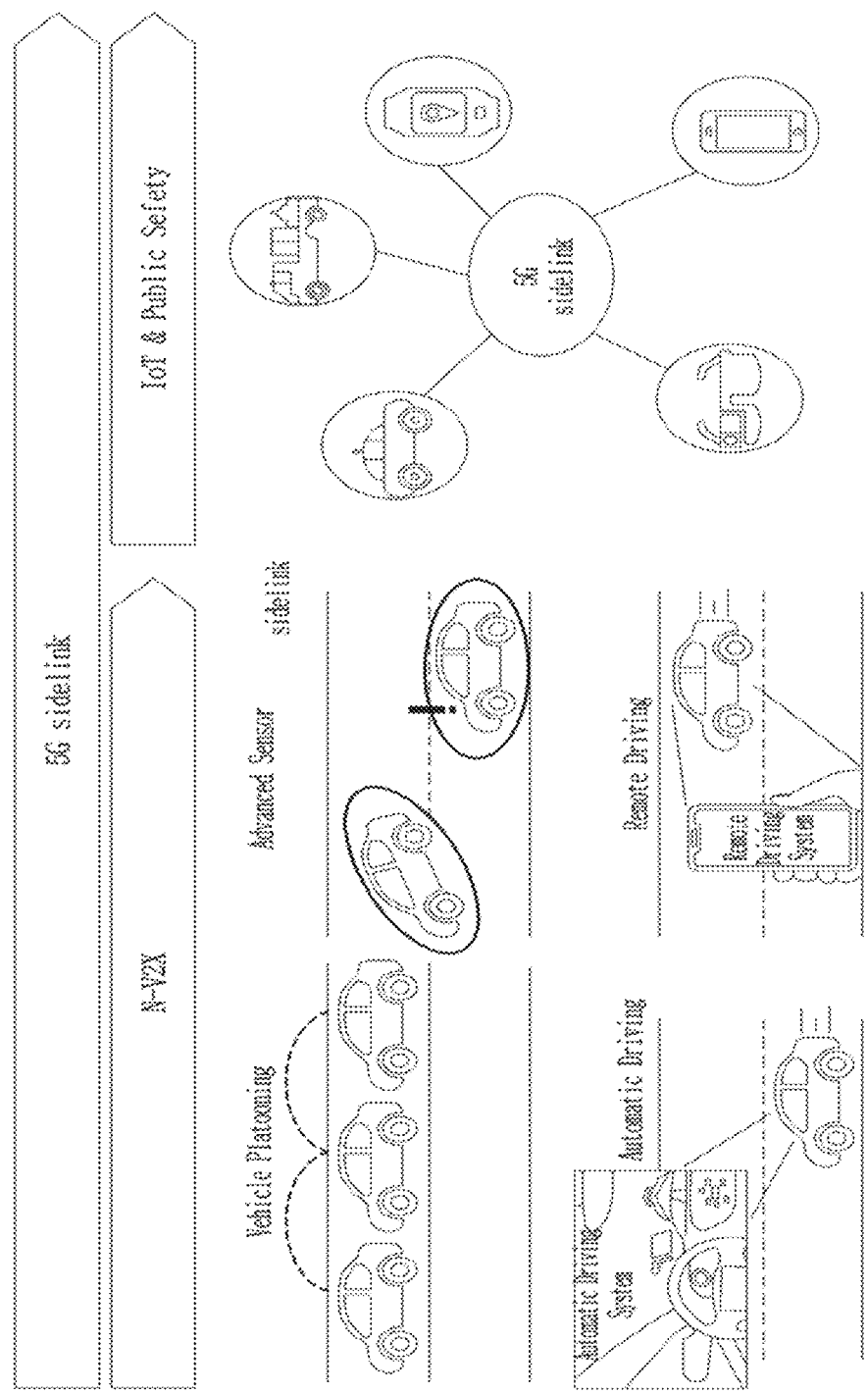
FIG. 4 illustrates an example of a V2X related service according to the present disclosure.

Various examples of the disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

In describing the examples, detailed description on known configurations or functions may be omitted for clarity and conciseness. Throughout the drawings and the detailed description, unless otherwise described, the same drawing reference numerals are understood to refer to the same elements, features, and structures.

It will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Further, the terms, such as first, second, and the like, may be used herein to describe elements in the description herein. The terms are used to distinguish one element from another element. Thus, the terms do not limit the element, an arrangement order, a sequence or the like.

Therefore, a first element in an example may be referred to as a second element in another example. Likewise, a second element in an example may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the disclosure.

Herein, elements described in various examples may not be necessarily essential and may be partially selectable. Therefore, an example including a partial set of elements described in an example is also included in the scope of the disclosure. Also, an example that additionally includes another element to elements described in various examples is also included in the scope of the disclosure.

Further, the description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing legacy system, the scope of the present disclosure is not limited thereto.

For example, a new radio (NR) system supports various subcarrier spacings (SCSs) by considering various scenarios, service requirements, potential system compatibility, and the like. Also, to overcome a poor channel environment, such as high pathloss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra Machine Type Communications (uMTC), and Ultra Reliable and Low Latency Communications (URLLC). Here, the term "NR system" used herein is used as an example of a wireless communication system, and the term "NR system" itself is not limited to the aforementioned features.

Also, for example, 5-th generation (5G) mobile communication technology may be defined. Here, 5G mobile communication technology may be defined by including the existing Long Term Evolution-Advanced (LTE-A) system as well as the aforementioned NR system. That is, 5G mobile communication technology may operate by considering backward compatibility with a previous system as well as a newly defined NR system.

For example, a sidelink field of 5G may include all of sidelink technology in an LTE system and sidelink technology in an NR system. Here, the sidelink field may be essential to enhance a performance and to integrate various services through an ultra high reliability and an ultra low latency.

In the following, for clarity of description, an operation for vehicle-to-everything (V2X) communication and related information will be described based on the NR system. Here, the following features may not be limited to a specific system and may apply alike to other systems that are similarly configured. However, it is provided as an example only and the present disclosure is not limited thereto.

Meanwhile, V2X communication may be communication based on a vehicle. Here, the concept of a vehicle is evolving from a simple transportation device to a new platform. For example, information technology (IT) applies to a vehicle and various V2X services are provided accordingly. Services, such as, for example, prevention of traffic accidents, improvement of traffic environments, automatic driving, and remote driving, are provided. To this end, there is a growing need for developing and applying sidelink related technology.

In detail, with respect to existing communication technology, a communication from a base station (e.g., eNodeB) to a user equipment (UE) may be a downlink and a communication from the UE to the base station may be an uplink. Here, communication between UEs may be required in addition to the communication between the base station and the UE. Here, the communication from one UE to another UE may be the aforementioned sidelink. For example, with respect to the aforementioned V2X communication, a vehicle-to-vehicle (V2V) communication or communication between a vehicle and another object (e.g., an object, excluding the base station, such as a pedestrian UE, a UE-type roadside unit (RSU), and the like) may be a sidelink. That is, in the case of performing vehicle-based communication, there are some constraints using only communication with the base station alone. Therefore, the aforementioned sidelink technology may be developed and applied. Hereinafter, a method of indicating information related to a demodulation reference signal (DMRS) for V2X communication is described.

FIGS. 1 to 3 illustrate V2X scenarios.

Here, FIG. 1 may be a scenario of performing communication based on the aforementioned sidelink. Also, FIG. 2 may be a scenario of performing a V2X operation using communication between a UE (or a vehicle) and a base station. Also, FIG. 3 may be a scenario of performing communication using all of the aforementioned sidelink and communication with the base station.

Here, with respect to V2X communication, the following UE may be, for example, a vehicle. Although the term "UE" is used for clarity of description, the UE may refer to a vehicle for V2X communication. Also, for example, the UE may refer to a device capable of performing communication with a sidelink and the base station and is not limited thereto. Here, the term "UE" is used in the following for clarity of description.

Also, for example, terms related to V2X communication may be defined as the following Table 1. Here, for example, device-to-device (D2D) communication may refer to communication between UEs. Also, the term "proximity-based service (ProSe)" may indicate a proximity service to a UE that performs D2D communication. Also, SL (sidelink) may be the aforementioned sidelink and sidelink control information (SCI) may indicate control information related to the aforementioned sidelink. Also, a Physical Sidelink Shared Channel (PSSCH) may be a channel used to transmit data through a sidelink and a Physical Sidelink Control Channel (PSCCH) may be a channel used to transmit control information through a sidelink. Also, a Physical Sidelink Broadcast Channel (PSBCH) may be a channel used to broadcast a signal through a sidelink and to forward system information. Also, a Physical Sidelink Discovery Channel (PSDCH) may be a discovery channel, that is, a channel used to discover a signal. Also, a sidelink synchronization signal (SLSS) may be a synchronization signal for sidelink and physical sidelink synchronization identity (PSSID) may be ID information for sidelink synchronization. Also, $n^{SA}ID$ (sidelink group destination identity) may be ID information used to identify a sidelink group and $N^{SL}ID$ may be ID information for the aforementioned sidelink synchronization. In addition, the terms "SA", "TB", "TTI", and "RB" in Table 1 may be the same terms used in the existing LTE. Also, V2V may represent vehicle-to-vehicle communication, V2P may represent vehicle-to-pedestrian communication, and V2I/N may represent vehicle-to-infrastructure/network communication. Description related thereto is made below.

[Table 1]
D2D: Device to Device (communication)
ProSe: (Device to Device) Proximity Services
SL: Sidelink
SCI: Sidelink Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel
SLSS: Sidelink Synchronization Signal
PSSID(SLID): Physical-layer Sidelink Synchronization Identity (Sidelink Identity)
$n^{SA}ID$: Sidelink Group Destination Identity
$N^{SL}ID$: Physical Layer Sidelink Synchronization Identity
SA: Scheduling Assignment
TB: Transport Block
TTI Transmission Time Interval
RB: Resource Block
V2V: Vehicle to Vehicle
V2P: Vehicle to Pedestrian
V2I/N: Vehicle to Infrastructure/Network In V2X communication, control information transmitted from a UE to another UE may be scheduling assignment (SA). If the aforementioned control information is used for sidelink communication, the control information may be SCI. Here, if the control information is transmitted through a sidelink, the control information may be transmitted through the aforementioned PSCCH that is a channel used to transmit control information in the sidelink.

Also, in V2X communication, data transmitted from a UE to another UE may be configured based on a unit of a transport port (TB). Here, if the data is transmitted through a sidelink, the data may be transmitted through the aforementioned PSSCH that is a channel used to transmit data.

Herein, an operation mode may be defined based on a resource allocation method for transmitting data and control information for V2X communication or direct link (e.g., D2D, ProSe, or SL) communication.

A base station resource scheduling mode may be a mode in which a base station or a relay node schedules resources used for a UE to transmit V2X (or direct link) control information and/or data. Through this, the UE may transmit the V2X (or direct link) control information and/or data. This mode may refer to the base station resource scheduling mode.

The base station or the relay node may provide, to a sidelink (or direct link) transmitting UE, scheduling information about resources used to transmit sidelink (or direct ink) control information and/or data through downlink control information (DCI). Therefore, the sidelink (or direct link) transmitting UE may transmit the sidelink (or direct link) control information and data to a sidelink (or direct link) receiving UE, and the sidelink (or direct link) receiving UE may receive sidelink (or direct link) data based on the sidelink (or direct link) control information.

A UE autonomous resource selection mode may be a mode in which a UE autonomously selects resources used to transmit control information and data and such resource selection may be determined through sensing of the UE from a resource pool (i.e., a set of resource candidates). Through this, the UE may transmit control information and data. This mode may refer to the UE autonomous resource selection mode.

For example, the sidelink (or direct link) transmitting UE may transmit sidelink (or direct link) control information and data to the sidelink (or direct link) receiving UE using its selected resource, and the sidelink (or direct link) receiving UE may receive sidelink (or direct link) data based on sidelink (or direct link) control information.

Here, the aforementioned base station resource scheduling mode may be referred to as Mode 1 in sidelink (or direct link) communication for D2D and the like. Also, the base station resource scheduling mode may be referred to as Mode 3 in sidelink communication for V2X and the like. Also, the UE autonomous resource selection mode may be referred to as Mode 2 in sidelink (or direct link) communication for D2D and the like. Also, the UE autonomous resource selection mode may be referred to as Mode 4 in sidelink communication for V2X and the like. However, they are provided as examples only and the present disclosure is not limited thereto. That is, they may be regarded as the same mode with respect to the same target and the same operation.

Although the following description is made based on V2X communication for clarity of description, it is provided as an example only. For example, the present disclosure may apply alike to communication based on a direct link such as D2D, ProSe, and the like, and the present disclosure is not limited thereto.

V2X may be a general term for V2V, V2P, and V2I/N. Here, each of V2V, V2P, and V2I/N may be defined as the following Table 2, however, it is provided as an example only and the present disclosure is not limited thereto. That is, the following Table 2 is provided as an example only.

TABLE 2

| | |
|---|---|
| V2V | LTE or NR based communication between a vehicle and another vehicle |
| V2P | LTE or NR based communication between a vehicle and a device carried by an individual (e.g., a terminal carried by a pedestrian, a cyclist, a driver, or a passenger) |
| V2I/N | LTE or NR based communication between a vehicle and a roadside unit(RSU)/network The RSU refers to a suspended social infrastructure entity that supports V2X applications and may exchange messages with other independent entities that support V2X applications. The RSU is a logical independent entity integrated with a V2X application logic having functions of an eNodeB (in this case, referable as an eNB-type RSU) or a UE (in this case, referable as a UE-type RSU). |

V2X communication may include PC-5 based communication that is an interface for sidelink communication.

For example, the following Table 3 and FIG. 1 may refer to a scenario for supporting a V2X operation based on a PC5 interface (or SL). Here, (a) of FIG. 1 illustrates an example of a V2V operation, (b) of FIG. 1 illustrates an example of a V2I operation, and (c) of FIG. 1 illustrates an example of a V2P operation. That is, FIG. 1 illustrates a method of performing communication based on the sidelink (SL). Here, communication may be performed without a base station.

[Table 3]

Scenario that supports a V2X operation operating based on only PC5

In this scenario, a UE transmits a V2X message to a plurality of UEs present in a local area through a sidelink.

With respect to V2I, a transmitter UE or receiver UE(s) may be a UE-type roadside unit (RSU).

With respect to V2P, a transmitter UE or receiver UE(s) may be a pedestrian UE.

Meanwhile, the following Table 4 and FIG. 2 may refer to a scenario for supporting a V2X operation based on a Uu interface (i.e., an interface between a UE and abase station). Here, (a) of FIG. 2 illustrates an example of a V2V operation, (b) of FIG. 2 illustrates an example of a V2I operation, and (c) of FIG. 2 illustrates an example of a V2P operation. That is, the V2X operation may be supported using communication between a UE and a base station.

[Table 4]

Scenario that supports a V2X operation operating based on only Uu interface

In this scenario,

With respect to V2V and V2P, a UE transmits a V2X message to an Evolved-Universal Terrestrial Radio Access Network (E-UTRAN) through an uplink, and the E-UTRAN transmits the V2X message to a plurality of UEs present in a local area through a downlink.

With respect to V2I, if a receiver is an eNodeB-type RSU, a UE transmits a V2I message to an E-UTRAN (eNodeB-type RSU) through an uplink; and if a transmitter is an eNodeB-type RSU, the E-UTRAN (eNodeB-type RSU) transmits the V2I message to a plurality of UEs present in a local area.

With respect to V2P, a transmitter UE or receiver UE(s) may be a pedestrian UE.

To support this scenario, the E-UTRAN performs uplink reception and downlink transmission of a V2X message and uses a broadcast mechanism with respect to a downlink.

The following Table 5 and FIG. 3 may refer to a scenario for supporting a V2X operation that uses all of a UE interface and PC5 interface (or SL). Here, (a) of FIG. 3 illustrates Scenario 3A of Table 5 and (b) of FIG. 3 illustrates Scenario 3B of Table 5.

In detail, referring to (a) of FIG. 3, a UE may transmit a V2X message to other UEs through a sidelink. One of the UEs receiving the V2X message may transmit the V2X message to a base station through an uplink (UL). The base station may receive the V2X message and may transmit a message based on the V2X message to other neighboring UEs through a downlink (DL). Here, for example, the downlink transmission may be performed using a broadcast method.

As another example, referring to (b) of FIG. 3, a UE may transmit a V2X message to a base station through an uplink (UL) and the base station may transmit the V2X message to at least one UE or RSU. In response thereto, the UE or the RSU may transmit the received message to a plurality of neighboring UEs through a sidelink (SL).

That is, in (a) and (b) of FIG. 3, the V2X operation may be supported using all of communication between the base station and the UE and the sidelink. However, it is provided as an example only.

[Table 5]
Scenario in which a UE transmits a V2X message to other UEs through a sidelink
  Scenario 3A—In this scenario, a UE transmits a V2X message to other UEs through a sidelink. One of a plurality of receiver UEs is a UE-type RSU and receives the V2X message through the sidelink and transmits the V2X message to an E-UTRAN through an uplink. The E-UTRAN receives the V2X message from the UE-type RSU and transmits the V2X message to a plurality of UEs present in a local area through a downlink.
  To support this scenario, the E-UTRAN performs uplink reception and downlink transmission of the V2X message, and uses a broadcast mechanism with respect to the downlink.
  Scenario 3B—In this scenario, a UE transmits a V2X message to an E-UTRAN through an uplink. The E-UTRAN transmits the V2X message to at least one UE-type RSU. The UE-type RSU transmits the V2X message to other UEs through a sidelink.
  To support this scenario, the E-UTRAN performs uplink reception and downlink transmission of the V2X message, and uses a broadcast mechanism with respect to the downlink.

As described above, the V2X communication may be performed through the base station and may be performed through direct communication between UEs. Here, if the base station is used, transmission and reception may be performed through a Uu link that is a communication interface between an LTE eNodeB and UE in LTE-based V2X communication. Also, if the sidelink is used for the direct communication between UEs, transmission and reception may be performed through a PC5 link that is a communication interface between LTE UEs in the LTE-based V2X communication.

In an NR system, the V2X communication may be performed using communication between a UE and a base station and a sidelink between UEs. Here, for example, there may be a difference between a communication (uplink/downlink) method between the base station and the UE in the NR system and a communication (uplink/downlink) method between the base station and the UE in an existing system. That is, the communication methods may be similar in terms of some features and there may be some changes based on the NR system that is a new system. Also, for example, there may be a difference between the sidelink in the NR system and the sidelink in the existing system. That is, there may be some changes in the sidelink based on the NR system that is a new system by considering the aforementioned communication difference between the base station and the UE. Hereinafter, a method of transmitting information related to a DMRS for V2X in the NR system is described based on the aforementioned features.

FIG. 4 illustrates an example of a service provided based on a sidelink.

Referring to FIG. 4, a V2X related service or an Internet of Things (IoT) service may be provided based on a 5G sidelink. Here, for example, the 5G sidelink may be a concept that includes all of a sidelink based on an existing LTE system and a sidelink based on an NR system. That is, the 5G sidelink may be a service that is provided by considering the sidelink applied in each system. However, it is provided as an example only.

For example, referring to FIG. 4, with respect to a V2X service, a vehicle platooning, an automatic driving, an advanced sensor, and a remote driving service may be provided. Here, the vehicle platooning may refer to technology that allows a plurality of vehicles to dynamically form a group and operate in a similar manner. Also, the automatic driving may refer to technology that drives a vehicle based on a complete automation and a semi-automation. Also, the advanced sensor may refer to technology that collects and exchanges data acquired from a sensor or a video image. Also, the remote driving may refer to technology for remotely controlling a vehicle and technology for an application. That is, the aforementioned services may be provided as a V2X-based service. Here, the services are provided as examples only and the present disclosure is not limited thereto. Here, requirements, such as ultra latency, ultra connectivity, low power, and high reliability, may be required to provide the V2X service. Therefore, the 5G sidelink may require an operation method for meeting the services and the requirements according thereto. A detailed method considering the requirements is described in the following.

Hereinafter, the NR system is described. For example, FIGS. 5 and 6 illustrate examples of a frame structure and a resource block for the NR system.

Figure 5:
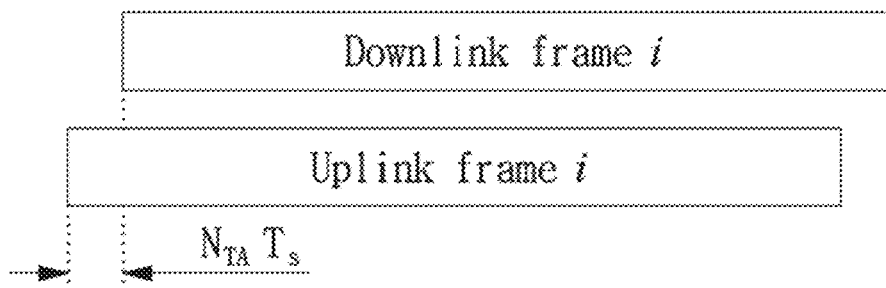
FIG. 5 illustrates an example of a frame structure for an uplink/downlink transmission according to the present disclosure.
Figure 6:
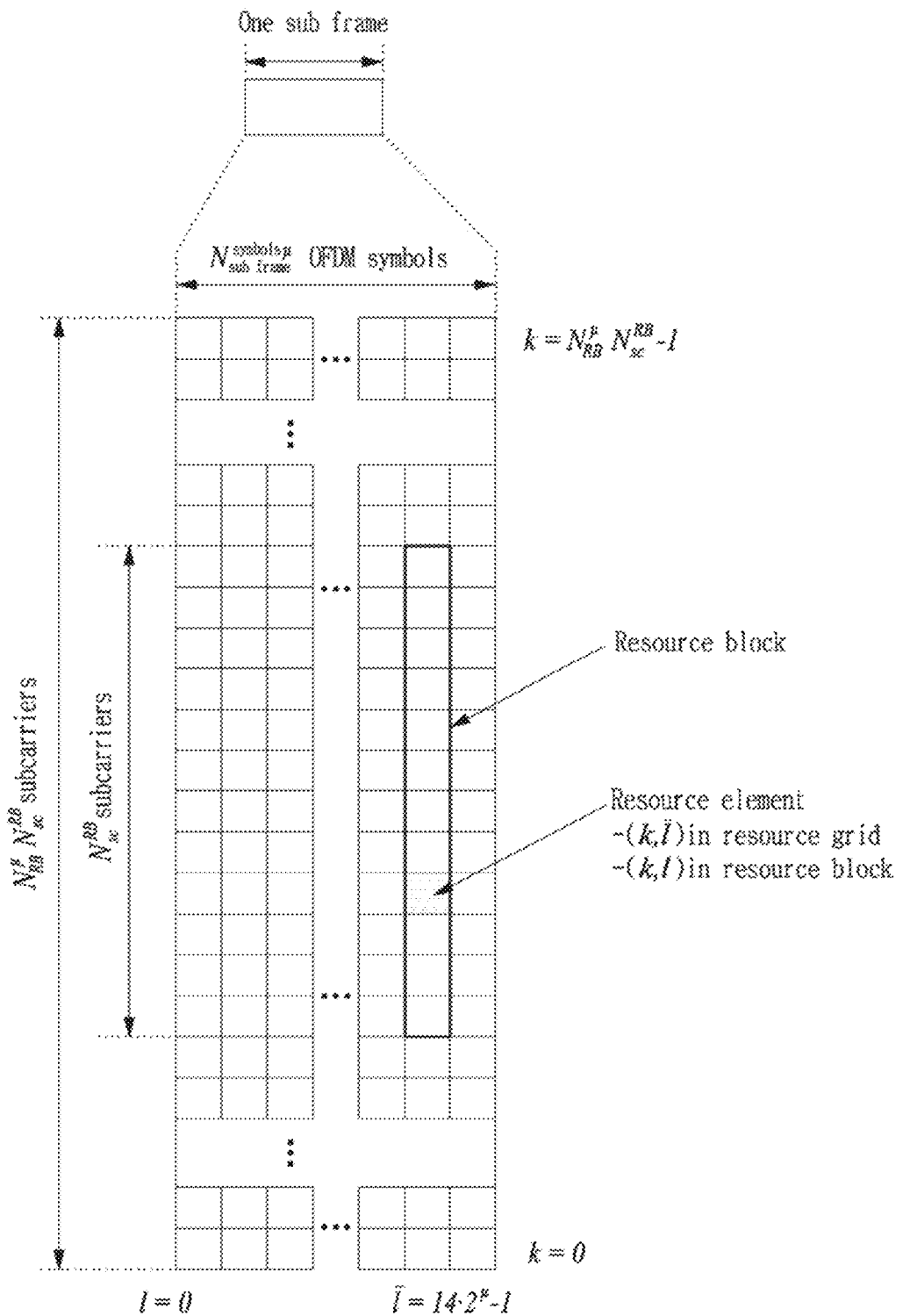
FIG. 6 illustrates an example of a resource grid and a resource block according to the present disclosure.

FIG. 5 illustrates an example of an NR frame structure and a numerology according to an embodiment of the present disclosure.

In NR, a basic unit of a time domain may be $T_c=1/(\Delta f_{max} \cdot N)$. Here, $\Delta f_{max}=480 \cdot 10^3$ and $N_f=4096$. Also, $K=T_s/T_c=64$ may be a constant about a multiple relationship between an NR time unit and an LTE time unit. In LTE, $T_s=1/(\Delta f_{ref} \cdot N_{f,ref})$, $\Delta f_{ref}=15 \cdot 10^3$ Hz, and $N_{f,ref}=2048$ may be defined as a reference time unit.

Frame Structure

Referring to FIG. 5, a time structure of a frame for a downlink/uplink (DL/UL) transmission may include $T_f=(\Delta f_{max} N_f/100) \cdot TS=10$ ms. Here, a single frame may include 10 subframes corresponding to $T_{sf}=(\Delta f_{max} N_f/1000) \cdot TS=1$ ms. A number of consecutive OFDM symbols per subframe may be $N_{symb}^{subframe,\mu}=N_{symb}^{slot} N_{slot}^{subframe,\mu}$. Also, each frame may be divided in two half frames and the half frames may include 0-4 subframes and 5~9 subframes. Here, half frame 1 may include 0-4 subframes and half frame 2 may include 5~9 subframes.

Here, a transmission timing of uplink transmission frame i is determined based on a downlink reception time at a UE according to the following Equation 1.

In Equation 1, $N_{TA,offset}$ denotes a TA offset occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time.

$$N_{TA}=(N_{TA}+N_{TA,offset})T_c \quad \text{[Equation 1]}$$

FIG. 6 illustrates an example of a resource grid and a resource block.

Referring to FIG. 6, a resource element within a resource grid may be indexed based on each subcarrier spacing. Here, a single resource grid may be generated for each antenna port and for subcarrier spacing. Uplink/downlink transmission and reception may be performed based on a corresponding resource grid.

A single resource block is configured on a frequency domain using 12 resource elements and configures an index $n_{PRB}$ for a single resource block every 12 resource elements as represented by the following Equation 2. An index of the resource block may be used in a specific frequency band or system bandwidth.

$$n_{PRB} = \left\lfloor \frac{k}{N_{sc}^{RB}} \right\rfloor \quad \text{[Equation 2]}$$

Numerologies

Numerologies may be variously configured to meet various services and requirements of the NR system. For example, a plurality of subcarrier spacings (SCSs) may be supported, which differs from the existing LTE/LTE-A system that supports a single SCS.

A new numerology for the NR system that includes supporting the plurality of SCSs may operate in the frequency range or carrier, such as 3 GHz or less, 3 GHz-6 GHz, or 6 GHz-52.6 GHz, to solve an issue that a wide bandwidth is unavailable in the existing frequency range or carrier, such as 700 MHz or 2 GHz. However, the scope of the present disclosure is not limited thereto.

For example, referring to the following Table 6, the numerologies may be defined based on an SCS, a cyclic prefix (CP) length, and a number of OFDM symbols per slot, which are used in an OFDM system. The aforementioned values may be provided to a UE through upper layer parameters, DL-BWP-mu and DL-BWP-cp (DL) and UL-BWP-mu and UL-BWP-cp (UL).

Also, for example, referring to the following Table 6, if $\mu=2$ and SCS=60 kHz, a normal CP and an extended CP may be applied. In other bands, only the normal CP may be applied.

TABLE 6

| $\mu$ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having a number of symbols less by at least one symbol than that of the normal slot. For example, in the case of providing a low latency such as a Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, a number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to $\mu=1$ and 2 may be used in the unlicensed band of 6 GHz or less and an SCS corresponding to $\mu=3$ and 4 may be used in the unlicensed band above 6 GHz.

Also, Table 7 shows a number of OFDM symbols per slot ($N_{slot}^{symb,\mu}$) for each SCS setting per $\mu$ in normal CP. Table 7 shows a number of OFDM symbols per slot ($N_{symb}^{slot}$) according to each SCS value, a number of slots per frame ($N_{slot}^{frame,\mu}$), and a number of slots per subframe ($N_{slot}^{subframe,\mu}$), as provided by Table 6. Here, in Table 7, the values are based on the normal slot having 14 OFDM symbols.

TABLE 7

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Also, as described above, if $\mu=2$ and SCS=60 kHz, the extended CP may be applied. In Table 8, in the case of the extended CP, each value may be indicated based on the normal slot of which the number of OFDM symbols per slot ($N_{slot}^{symb,\mu}$) is 12. Here, Table 8 shows the number of symbols per slot ($N_{symb}^{slot}$), the number of slots per frame ($N_{slot}^{frame,\mu}$), and the number of slots per subframe ($N_{slot}^{subframe,\mu}$) in the case of the extended CP that follows the SCS of 60 kHz.

TABLE 8

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Also, as described above, a single subframe may correspond to 1 ms on a time axis. Also, a single slot may correspond to 14 symbols on the time axis. Also, for example, a single slot may correspond to 7 symbols on the time axis. Therefore, a number of slots and a number of symbols available in 10 ms corresponding to a single radio frame may be differently set. Table 9 shows a number of slots and a number of symbols according to each SCS. Here, for example, an SCS of 480 kHz may not be considered and the present disclosure is not limited thereto.

TABLE 9

| | Number of symbols | | |
|---|---|---|---|
| SCS | Slot within 10 ms | Slot within 10 ms | Number of symbols within 10 ms |
| 15 kHz | 10 | 20 | 140 |
| 30 kHz | 20 | 40 | 280 |
| 60 kHz | 40 | 80 | 560 |
| 120 kHz | 80 | N/A | 1120 |
| 240 kHz | 160 | N/A | 2240 |
| 480 kHz | 320 | N/A | 4480 |

A demodulation reference signal (DMRS) for V2X may be configured based on the NR system. For example, in the existing V2X, a DMRS may be transmitted on a single antenna port corresponding to a single layer.

Here, with respect to DMRS transmission for V2X, it is possible to configure and transmit a DMRS while maintaining orthogonality between a plurality of layers.

For example, in the NR system, a number of DMRS orthogonal antenna ports for V2X may be 12. In detail, in the NR system, the DMRS antenna ports may be distinguished using a maximum of 12 layers by considering all of UEs in multi-user multiple input multiple output (MIMO) communication. For example, numbers of DMRS antenna ports may be set using #0, #1, #2, #3, #4, #5, #6, #7, #8, #9, #10, and #11. As another example, if a number of RS antenna ports corresponding to a first antenna port of a DMRS is A, the numbers of DMRS antenna ports may be "#A, #A+1, #A+2, #A+3, #A+4, #A+5, #A+6, #A+7, #A+8, #A+9, #A+10, and #A+11".

Here, a DMRS configuration may include DMRS configuration type 1 and DMRS configuration type 2. For example, DMRS configuration type 1 may be based on interleaved frequency divisional multiple access (IFDMA) and DMRS configuration type 2 may be based on code division multiplexing (CDM). Here, they are provided as examples only and DMRS configuration type 1 and DMRS configuration type 2 may be distinguished from each other.

Also, for example, in the case of transmitting a DMRS, the DMRS may be transmitted using a single symbol. As another example, in the case of transmitting a DMRS, the DMRS may be transmitted using 2 symbols. That is, in the case of transmitting a DMRS, four cases of Table 10 may be considered based on the aforementioned DMRS configuration types and the number of symbols used. That is, a case of using a single symbol and a case of using two symbols may be considered for each DMRS configuration type.

[Table 10]
DMRS configuration type 1, using 1 symbol
DMRS configuration type 2, using 2 symbols
DMRS configuration type 3, using 1 symbol
DMRS configuration type 4, using 2 symbols Also, for example, supported antenna ports based on the above Table 10 may be provided as shown in the following Table 11. That is, referring to Table 11, the supported antenna ports may be set based on a DMRS configuration type and a corresponding number of symbols.

Description related thereto is made with reference to the following Table 13 and Table 14. Here, for example, l' may correspond to the number of symbols. That is, l' may be 0 for 1 symbol (single-symbol) and may be 0, 1 for 2 symbols (double-symbol). Also, p denotes the supported antenna ports.

TABLE 11

| | | Supported antenna ports p | |
|---|---|---|---|
| DM-RS duration | l' | Configuration type 1 | Configuration type 2 |
| single-symbol | 0 | 0-3 | 0-5 |
| double-symbol | 0,1 | 0-7 | 0-11 |

Also, for example, a maximum number of layers available for each of single user (SU)-MIMO and multi-user (MU)-MIMO based on the above Table 10 may be provided as shown in Table 12. That, a case in which a maximum number of DMRS layers available for each UE is N may be considered based on SU-MIMO and MU-MIMO. Here, each layer may correspond to one of the DMRS antenna ports (12 antenna ports).

[Table 12]
SU (Single-User)-MIMO (Multiple Input Multiple Output)
→DMRS configuration type 1
  In the case of using 1 symbol: distinguishes maximum N=4 layers
  In the case of using 2 symbols: distinguishes maximum N=8 layers
→DMRS configuration type 2
  In the case of using 1 symbol: distinguishes maximum N=6 layers
  In the case of using 2 symbols: distinguishes maximum N=8 layers
MU (Multi-User)-MIMO
→DMRS configuration type 1
  In the case of using 1 symbol: distinguishes maximum N=2 layers per UE (maximum 4 layers for all of the UEs)
  In the case of using 2 symbols: distinguishes maximum N=4 layers per UE (maximum 8 layers for all of the UEs)
→DMRS configuration type 2
  In the case of using 1 symbol: distinguishes maximum N=4 layers per UE (maximum 6 layers for all of the UEs)
  In the case of using 2 symbols: distinguishes maximum N=4 layers per UE Here, for example, with respect to the aforementioned DMRS configuration type 1 and DMRS configuration type 2, a maximum number of classifiable DMRS antenna ports may be determined based on the following Table 13 and Table 14. For example, in Table 13, $\tilde{p}$ denotes an antenna port. Here, a CDM group may differ based on a DMRS configuration type and Table 13 may correspond to the aforementioned DMRS configuration type 1. For example, in the DMRS configuration type, the CDM group may be classified into two groups. Also, for example, a DMRS antenna port may be determined based on $\omega_f(k')$ and $\omega_f(l')$. Here, in Table 13, $\omega_f(l')$ may be a value set based on a number of available symbols. In detail, as for DMRS configuration type 1, if the number of available symbols is two, a case in which $\omega_t(l')$ corresponds to l'=0 and l'=1 may be considered as shown in the following Table 13. That is, they may correspond to the respective symbols. Therefore, for example, if the number of available symbols is one, l'=1 may not be considered and not be used as a variable capable of distinguishing a DMRS antenna port.

That is, if the DMRS configuration type corresponds to DMRS configuration type 1 and the number of available symbols is one, a value of p may be set to be 0 to 3 in the following Table 13. Therefore, the maximum number of classifiable DMRS antenna ports may be four.

Meanwhile, if the DMRS configuration type corresponds to DMRS configuration type 1 and the number of available symbols is two, a value of p may be set to be 0 to 7. Therefore, the maximum number of available DMRS antenna ports may be 8.

TABLE 13

| $\tilde{p}$ | CDM group | Δ | $\omega_f(k')$ k' = 0 | $\omega_f(k')$ k' = 1 | $\omega_t(l')$ l' = 0 | $\omega_t(l')$ l' = 1 |
|---|---|---|---|---|---|---|
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

Also, for example, Table 14 may correspond to DMRS configuration type 2. For example, in the following Table 14, $\tilde{p}$ denotes an antenna port. Here, a CDM group may differ based on the aforementioned DMRS configuration type and a DMRS configuration type of Table 14 may correspond to the aforementioned DMRS configuration type 2. For example, in the DMRS configuration type, the CDM group may be classified into three groups. Also, for example, a DMRS antenna port may be determined based on $\omega_f(k')$ and $\omega_0(l')$. Here, in Table 14, $\omega_t(l')$ may be a value set based on the number of available symbols. In detail, as for DMRS configuration type 2, if the number of available symbols is two, a case in which $\omega_t(l')$ corresponds to l'=0 and l'=1 may be considered as shown in the following Table 14. That is, they may correspond to the respective symbols. Therefore, for example, if the number of available symbols is one, l'=1 may not be considered and not be used as a variable capable of distinguishing a DMRS antenna port.

That is, if the DMRS configuration type corresponds to DMRS configuration type 2 and the number of available symbols is one, a value of $\tilde{p}$ may be set to be 0 to 5 in the following Table 14. Therefore, the maximum number of classifiable DMRS antenna ports may be six.

Meanwhile, if the DMRS configuration type corresponds to DMRS configuration type 2 and the number of available symbols is two, a value of $\tilde{p}$ may be set to be 0 to 11 in the following Table 14. Therefore, the maximum number of classifiable DMRS antenna ports may be 12.

TABLE 14

| $\tilde{p}$ | CDM group | Δ | $\omega_f(k')$ k' = 0 | $\omega_f(k')$ k' = 1 | $\omega_t(l')$ l' = 0 | $\omega_t(l')$ l' = 1 |
|---|---|---|---|---|---|---|
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | −1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |

As an example, in detail, in the case of using a single symbol for DMRS configuration type 1, a maximum of four DMRS antenna ports may be distinguished from one another. For example, DMRS configuration type 1 may be set based on IFDMA. Here, "Comb Pattern A (corresponding to CDM group 0 in Table 13, allocated to subcarriers #0, #2, #4, #6, #8, and #10 among 12 subcarriers #0 to #11 within a single physical resource block (PRB) (Δ=0 since allocation is performed every two subcarriers starting from #0))" and "Comb Pattern B (corresponding to CDM group 1 in Table 13, allocated to subcarriers #1, #3, #5, #7, #9, and #11 among 12 subcarriers #0 to #11 within a single PRB (Δ=1 since allocation is performed every two subcarriers starting from #1))" may be alternately set for each single subcarrier among 12 subcarriers as a single PRB in a frequency domain. Here, a DMRS pattern may be iteratively expanded to a plurality of PRBs by a bandwidth allocated for physical channel (e.g., PDSCH, PUSCH, etc.) of each UE with respect to a frequency axis. Also, the DMRS pattern may apply to each DMRS configuration within a single slot with respect to a time axis. For example, the DMRS configuration may be "front-loaded DMRS configuration" as a fixed location and may be "additional DMRS configuration" as an additional configuration. However, it is provided as an example only.

Here, for example, a single PRB includes 12 resource elements (REs) and six REs may be allocated to each comb pattern with respect to a single symbol.

Here, a DMRS antenna port configuration may be provided as shown in Table 15. For example, in the following Table 15, a comb pattern may refer to the aforementioned "Comb pattern A" or "Comb pattern B". However, it simply indicates a different comb pattern and the present disclosure is not limited to such names. Also, a cyclic shift (CS) refers to a cyclic shift value of a DMRS sequence. If the range of available values includes 0 to X, "CS value A" may be 0 and "CS value B" may be X/2. For example, if X=12, "CS value A" may have a value of 0 and "CS value B" have a value of 6. Also, for example, if X=2r, "CS value A" may have a value of 0 and "CS value B" may have a value of 7. However, it is provided as an example only. That is, in the case of using a single symbol for DMRS configuration type 1, classification may be performed using initially a CS value and then a comb pattern.

Also, for example, referring to Table 15, DMRS antenna ports #0 and #1 may be allocated to "Comb pattern A", and DMRS antenna ports #2 and #3 may be allocated to "Comb pattern B". However, the present disclosure is not limited thereto.

TABLE 15

|  | Comb pattern | CS (Cyclic Shift) |
|---|---|---|
| DMRS antenna port #0 | Comb pattern A | CS value A |
| DMRS antenna port #1 | Comb pattern A | CS value B |
| DMRS antenna port #2 | Comb pattern B | CS value A |
| DMRS antenna port #3 | Comb pattern B | CS value B |

As another example, a case in which a DMRS configuration type corresponds to DMRS configuration type 1 and a number of available symbols is two may be considered. Here, "Comb Pattern A" and "Comb Pattern B" may be set for two symbols and 12 subcarriers (corresponding to a single PRB in a frequency domain) and may be alternately set for each single subcarrier in a similar manner as described above. Here, a DMRS pattern may be iteratively expanded to a plurality of PRBs by a bandwidth allocated for physical channel (e.g., PDSCH, PUSCH, etc.) of each UE with respect to a frequency axis. Also, the DMRS pattern may apply to each DMRS configuration within a single slot with respect to a time axis. For example, the DMRS configuration may be "front-loaded DMRS configuration" as a fixed location and may be "additional DMRS configuration" as an additional configuration. However, it is provided as an example only.

Here, for example, a total of six REs may be allocated per comb pattern with respect to a single symbol within a single PRB. Here, a DMRS antenna port configuration may be provided as shown in Table 16. For example, in the following Table 16, a comb pattern may refer to the aforementioned "Comb pattern A" or "Comb pattern B". Also, a cyclic shift (CS) refers to a cyclic shift value of a DMRS sequence. If the range of available values includes 0 to X, "CS value A" may be 0. Also, "CS value B" may be X/2. For example, if X=12, "CS value A" may have a value of 0 and "CS value B" have a value of 6. Also, for example, if X=2π, "CS value A" may have a value of 0 and "CS value B" may have a value of J. However, it is provided as an example only.

Also, a time domain-orthogonal cover code (TD-OCC) may apply to two adjacent REs on the time axis on the same subcarrier within each comb pattern. Here, in the case of generating a DMRS sequence, +1 or −1 may be multiplied with a sequence value of the DMRS sequence to be mapped to a corresponding RE. In detail, the DMRS sequence value may be multiplied as [+1,+1] or [+1, −1] with respect to a first RE on the time axis on the same subcarrier and a subsequent RE on the time axis on the same subcarrier.

That is, in the case of using two symbols for DMRS configuration type 1, classification may be initially performed using a CS value, then using a comb pattern, and finally using the TD-OCC. Also, for example, DMRS antenna ports #0, #1, #4, and #5 may be allocated to "Comb pattern A" and DMRS antenna ports #2, #3, #6, and #7 may be set to "Comb pattern B". However, the present disclosure is not limited thereto.

TABLE 16

|  | Comb pattern | CS (Cyclic Shift) | TD-OCC |
|---|---|---|---|
| DMRS antenna port | Comb pattern A | CS value A | [+1, +1] |
| DMRS antenna port | Comb pattern A | CS value B | [+1, +1] |
| DMRS antenna port | Comb pattern B | CS value A | [+1, +1] |
| DMRS antenna port | Comb pattern B | CS value B | [+1, +1] |
| DMRS antenna port | Comb pattern A | CS value A | [+1, −1] |
| DMRS antenna port | Comb pattern A | CS value B | [+1, −1] |

TABLE 16-continued

|  | Comb pattern | CS (Cyclic Shift) | TD-OCC |
|---|---|---|---|
| DMRS antenna port | Comb pattern B | CS value A | [+1, −1] |
| DMRS antenna port | Comb pattern B | CS value B | [+1, −1] |

As another example, a case in which a DMRS configuration type corresponds to DMRS configuration type 2 and a number of available symbols is one may be considered. Here, with respect to a single symbol and 12 subcarriers (corresponding to a single PRB in a frequency domain), "CDM group A (corresponding to CDM group 0 in Table 14, allocated to #0, #1, #6, and #7 among 12 subcarriers #0 to #11 within a single PRB (Δ=0 since allocation is performed every six subcarriers starting from #0 and #1))", "CDM group B (corresponding to CDM group 1 in Table 14, allocated to #2, #3, #8, and #9 among 12 subcarriers #0 to #11 within a single PRB (Δ=2 since allocation is performed every six subcarriers starting from #2 and #3))", and "CDM group C (corresponding to CDM group 2 in Table 14, allocated to #4, #5, #10, and #11 among 12 subcarriers #0 to #11 within a single PRB (Δ=4 since allocation is performed every six subcarriers starting from #4 and #5))" may be distinguished from one another. Here, it may indicate that three CDM groups may be set. However, the present disclosure is not limited to the names. Here, a DMRS pattern may be iteratively expanded to a plurality of PRBs by a bandwidth allocated for physical channel (e.g., PDSCH, PUSCH, etc.) transmission of each UE with respect to a frequency axis. Also, the DMRS pattern may apply to each DMRS configuration within a single slot with respect to a time axis. For example, the DMRS configuration may be "front-loaded DMRS configuration" as a fixed location and may be "additional DMRS configuration" as an additional configuration. However, it is provided as an example only.

Here, since three CDM groups are present, a total of four REs may be allocated to each CDM group. For example, in the case of using a single symbol for the aforementioned DMRS configuration type 2, a DMRS antenna port may be configured as shown in the following Table 17. Here, the CDM group may be "CDM group A", "CDM group B", or "CDM group C". Also, for example, a frequency domain-orthogonal cover code (FD-OCC) may apply to two adjacent REs on a frequency axis on the same symbol. In the case of generating a DMRS sequence, +1 or −1 may be multiplied with a sequence value of the DMRS sequence to be mapped to a corresponding RE as [+1, +1] or [+1, −1]. That is, the aforementioned value may be set using a first RE on the frequency axis on the same symbol and then using a subsequent RE on the frequency axis on the same symbol. That is, in the case of using a single symbol for DMRS configuration type 2, classification may be initially performed based on the FD-OCC and then a CDM group. Here, for example, DMRS antenna ports #0 and #1 may be set to "CDM group A", DMRS antenna ports #2 and #3 may be set to "CDM group B", and DMRS antenna ports #4 and #5 may be set to "CDM group C". However, the present disclosure is not limited thereto.

TABLE 17

|  | CDM group | FD-OCC |
|---|---|---|
| DMRS antenna port #0 | CDM group A | [+1, +1] |
| DMRS antenna port #1 | CDM group A | [+1, −1] |
| DMRS antenna port #2 | CDM group B | [+1, +1] |

TABLE 17-continued

|  | CDM group | FD-OCC |
|---|---|---|
| DMRS antenna port #3 | CDM group B | [+1, −1] |
| DMRS antenna port #4 | CDM group C | [+1, +1] |
| DMRS antenna port #5 | CDM group C | [+1, −1] |

Also, for example, in the case of using two symbols for DMRS configuration type 2, a maximum of 12 DMRS antenna ports may be classified. For example, with respect to two symbols and 12 subcarriers (corresponding to a single PRB in a frequency domain), "CDM group A", "CDM group B", and "CDM group C" may be set. That is, three CDM groups may be set and the present disclosure is not limited to the names. Here, a DMRS pattern may be iteratively expanded to a plurality of PRBs by a bandwidth allocated for physical channel (e.g., PDSCH, PUSCH, etc.) of each UE with respect to a frequency axis. Also, the DMRS pattern may apply to each DMRS configuration within a single slot with respect to a time axis. For example, the DMRS configuration may be "front-loaded DMRS configuration" as a fixed location and may be "additional DMRS configuration" as an additional configuration. However, it is provided as an example only.

Here, since three CDM groups are present, a total of four REs may be present per CDM group. For example, in the case of using a single symbol for the aforementioned DMRS configuration type 2, a DMRS antenna port may be configured as shown in the following Table 18. Here, in the following Table 18, the CDM group may be "CDM group A", "CDM group B", or "CDM group C".

Also, the FD-OCC may apply to two adjacent REs on a frequency axis on the same symbol within each CDM group. In the case of generating a DMRS sequence, +1 or −1 may be multiplied with a sequence value of the DMRS sequence to be mapped to a corresponding RE as [+1, +1] or [+1, −1]. That is, the sequence value of the DMRS sequence may be multiplied with a first RE on the frequency axis on the same symbol and then a subsequent RE on the frequency axis on the same symbol.

Also, the TD-OCC may apply to two adjacent REs on the time axis on the same subcarrier. In the case of generating a DMRS sequence, +1 or −1 may be multiplied with a sequence value of the DMRS sequence to be mapped to a corresponding RE as [+1, +1] or [+1, −1]. That is, the sequence value of the DMRS sequence may be multiplied with a first RE on the time axis on the same subcarrier and then a subsequent RE on the time axis on the same subcarrier.

That is, in the case of using two symbols for DMRS configuration type 2, classification may be performed based on the FD-OCC, then the CDM group, and then finally the TD-OCC. Here, for example, DMRS antenna ports #0, #1, #6, and #7 may be set to "CDM group A", DMRS antenna ports #2, #3, #8, and #9 may be set to "CDM group B", and DMRS antenna ports #4, #5, #10, and #11 may be set to "CDM group C". However, the present disclosure is not limited thereto.

TABLE 18

|  | CDM group | FD-OCC | TD-OCC |
|---|---|---|---|
| DMRS antenna port #0 | CDM group A | [+1, +1] | [+1, +1] |
| DMRS antenna port #1 | CDM group A | [+1, −1] | [+1, +1] |
| DMRS antenna port #2 | CDM group B | [+1, +1] | [+1, +1] |
| DMRS antenna port #3 | CDM group B | [+1, −1] | [+1, +1] |

TABLE 18-continued

|  | CDM group | FD-OCC | TD-OCC |
|---|---|---|---|
| DMRS antenna port #4 | CDM group C | [+1, +1] | [+1, +1] |
| DMRS antenna port #5 | CDM group C | [+1, −1] | [+1, +1] |
| DMRS antenna port #6 | CDM group A | [+1, +1] | [+1, −1] |
| DMRS antenna port #7 | CDM group A | [+1, −1] | [+1, −1] |
| DMRS antenna port #8 | CDM group B | [+1, +1] | [+1, −1] |
| DMRS antenna port #9 | CDM group B | [+1, −1] | [+1, −1] |
| DMRS antenna port #10 | CDM group C | [+1, +1] | [+1, −1] |
| DMRS antenna port #11 | CDM group C | [+1, −1] | [+1, −1] |

Hereinafter, a method of configuring a DMRS for PSCCH and a DMRS for PSSCH based on NR V2X is described. For example, the DMRS for PSSCH may be configured based on the aforementioned description. Also, for example, the DMRS for PSCCH as a control channel may be configured based on a PUCCH format 2 scheme. The following Table 19 may refer to a resource allocation method for PUCCH format 2. For example, referring to Table 19, in PUCCH format 2, k may indicate a relative location compared to subcarrier 0 of a resource block. Here, k may be set to a value of "3m+1". That is, since k is settable at a fixed location in a frequency domain based on m, a resource may be mapped at the fixed location. Here, the DMRS for PSCCH may be set at a fixed location in the frequency domain, which is similar to PUCCH format 2. That is, the DMRS for PSCCH may be set at the fixed location using k according to the PUCCH format 2 scheme. Here, configuring the DMRS for PSCCH based on PUCCH format 2 is provided as an example only and may be performed using another method. For example, the DMRS for PSCCH may be set at the fixed location according to another method and the present disclosure is not limited thereto.

[Table 19]

Mapping to Physical Resources

The sequence shall be multiplied with the amplitude scaling factor $\beta_{PUCCH,2}$ in order to conform to the transmit power specified in [5, 38.213] and mapped in sequence starting with $\gamma(0)$ to resource elements $(k, l)_{p,\mu}$ in a slot on antenna port $\rho=2000$ according to $$a_{k,l}^{(p,\mu)} = \beta_{PUCCH,2}\gamma^{(m)}$$

$$k = 3m+1$$

Where k is defined relative to subcarrier 0 of common resource block 0 and $(k, l)_{p,\mu}$ shall be within the resource blocks assigned for PUCCH transmission according to [5, TS38.213]

Also, for example, in NR V2X, the PSCCH and the PSSCH may be distinguished based on FDM and may be distinguished based on a symbol unit in a time domain. That is, the PSCCH and the PSSCH may be allocated to be distinguishable for each symbol on the same subframe. In detail, FIGS. 7 to 10 illustrate examples of a method of allocating a PSCCH and a PSSCH.

Figure 7:
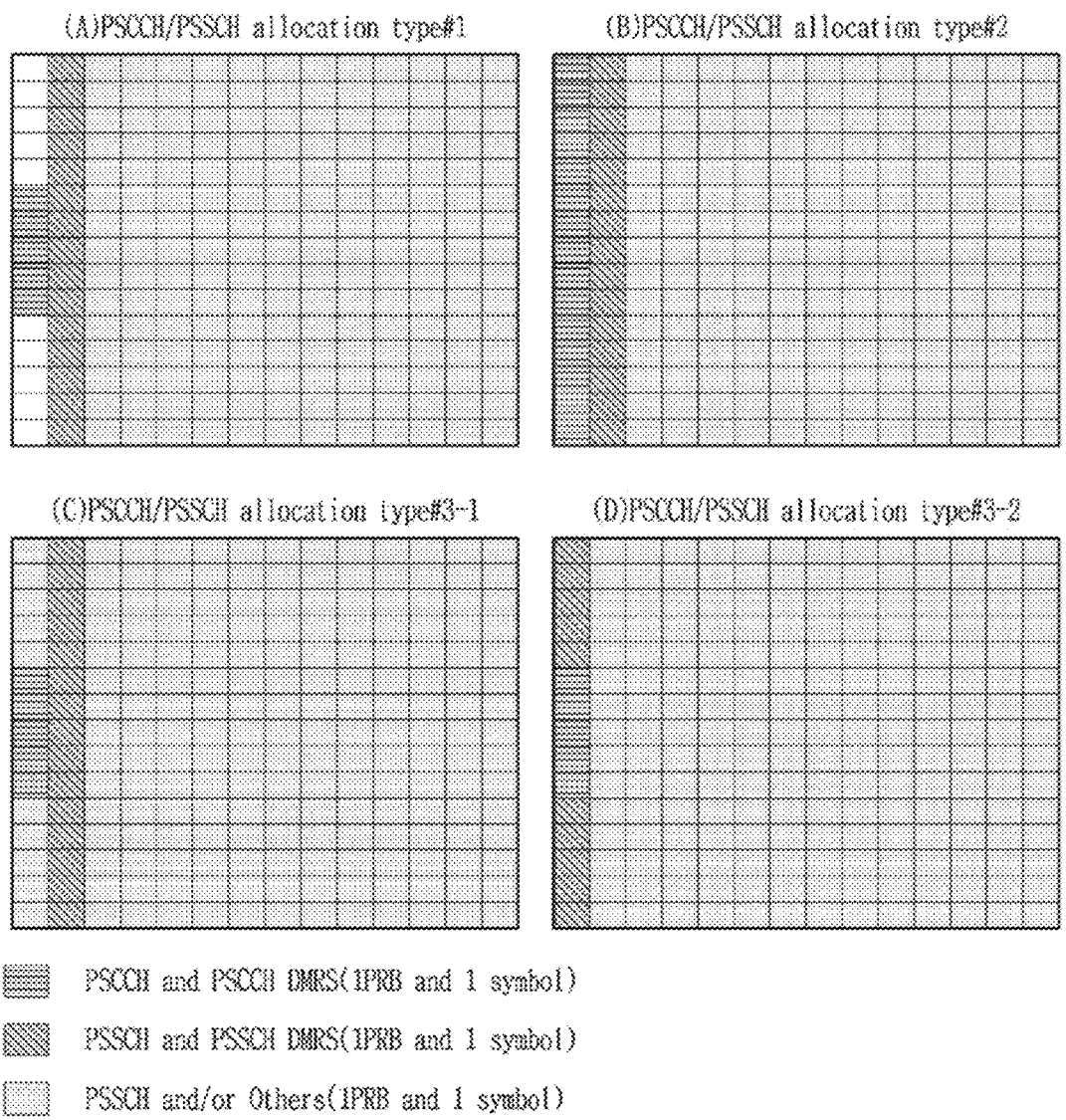
FIG. 7 illustrates an example of a method of allocating a Physical Sidelink Control Channel (PSCCH) and a Physical Sidelink Shared Channel (PSSCH) according to the present disclosure.

Here, FIG. 7 illustrates an example in which a DMRS for PSCCH is configured using a single symbol and a DMRS for PSSCH is set based on "front-loaded DMRS" using a single symbol. For example, referring to FIG. 7, a different allocation type may be set depending on whether a frequency domain to which the PSCCH is allocated is identical to a frequency domain to which the PSSCH is allocated. Here, (A) of FIG. 7 corresponds to type 1 in which the frequency domain to which the PSCCH is allocated may differ from the frequency domain to which the PSSCH is allocated. On the contrary, (B) of FIG. 7 corresponds to type 2 in which the frequency domain to which the PSCCH is allocated may be identical to the frequency domain to which the PSSCH is allocated. Also, for example, in the case of type 1, another frequency domain excluding the frequency domain to which the PSCCH is allocated is empty or another channel may be allocated thereto. On the contrary, (C) and (D) of FIG. 7 correspond to type 3 in which the PSSCH may be additionally allocated to the empty space aside from the frequency domain to which the PSCCH is allocated. That is, data may be transmitted through the empty space aside from the frequency domain to which the PSCCH is allocated. For example, (C) of FIG. 7 corresponds to type 3-1 in which only the PSSCH may be allocated to an area aside from the frequency domain to which the PSCCH is allocated. That is, a DMRS for PSSCH may not be allocated. On the contrary, (D) of FIG. 7 corresponds to type 3-2 in which a DMRS for PSSCH and PSSCH may be allocated to an area aside from the frequency domain to which the PSCCH is allocated. Here, a method of configuring a DMRS for PSCCH and a DMRS for PSSCH may be required based on the aforementioned allocation methods, which is further described below. Also, the aforementioned types are provided as an example only and another type may be used for allocation. The present disclosure is not limited thereto.

Also, for example, considering the aforementioned type 3-1 of (C) of FIG. 7 and type 3-2 of (D) of FIG. 7, a PSSCH DMRS may be allocated from a first symbol in the case of the type 3-2 of (D) of FIG. 7. Therefore, fast demodulation may be performed for the PSSCH. Also, for example, considering the aforementioned type 3-1 of (C) of FIG. 7 and type 3-2 of (D) of FIG. 7, resources for the PSSCH DMRS may share resources for a PSCCH DMRS in the case of type 3-2 of (D) of FIG. 7. Therefore, resources for the PSSCH DMRS may be saved. As another example, in the case of allocation based on a non-slot, a DMRS allocation may be efficient for the type 3-2 of (D) of FIG. 7. However, it is provided as an example only and the present disclosure is not limited thereto. For example, a non-slot may refer to a slot having a number of symbols less by at least one symbol than that of a normal slot. In the aforementioned case, the DMRS allocation may be efficient. For example, in the case of two symbols as a non-slot, the DMRS allocation may be required based on the aforementioned type 3-2.

Figure 8:
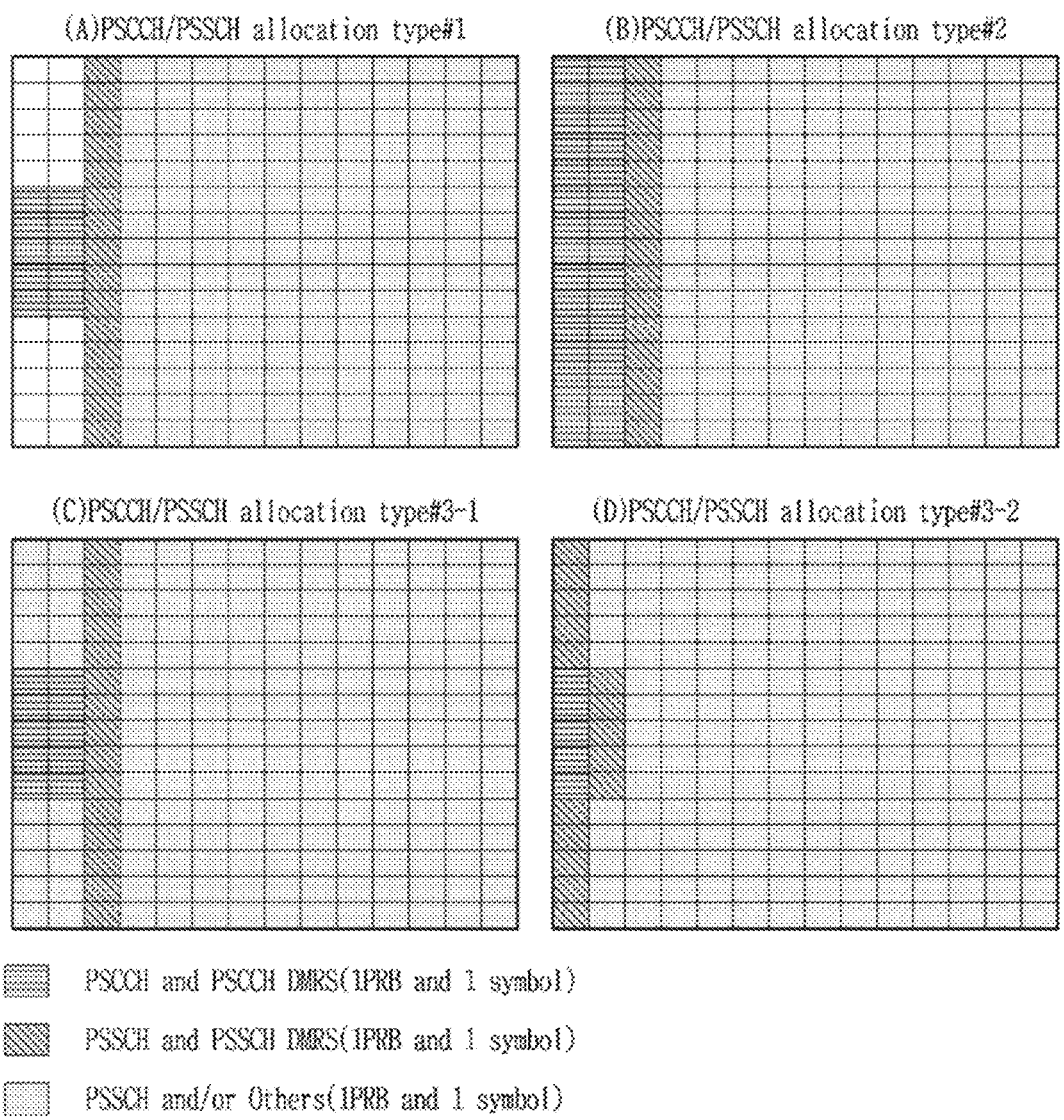
FIG. 8 illustrates an example of a method of allocating a PSCCH and a PSSCH according to the present disclosure.

Also, FIG. 8 illustrates an example of a method in which a DMRS for PSCCH is configured using two symbols and a DMRS for PSSCH is set based on "front-loaded DMRS" using a single symbol. For example, referring to FIG. 8, a different allocation type may be set depending on whether a frequency domain to which the PSCCH is allocated is identical to a frequency domain to which the PSSCH is allocated. Here, (A) of FIG. 8 corresponds to type 1 in which the frequency domain to which the PSCCH is allocated may differ from the frequency domain to which the PSSCH is allocated. On the contrary, (B) of FIG. 8 corresponds to type 2 in which the frequency domain to which the PSCCH is allocated may be identical to the frequency domain to which the PSSCH is allocated. Here, the PSCCH may be allocated to two symbols and the PSSCH may be allocated to a single symbol. Also, for example, in the case of type 1, another frequency domain excluding the frequency domain to which the PSCCH is allocated is empty or another channel may be allocated thereto. On the contrary, (C) and (D) of FIG. 8 correspond to type 3 in which the PSSCH may be additionally allocated to the empty space aside from the frequency domain to which the PSCCH is allocated. That is, data may be transmitted through the empty space aside from the frequency domain to which the PSCCH is allocated. For example, (C) of FIG. 8 corresponds to type 3-1 in which only the PSSCH may be allocated to an area aside from the frequency domain to which the PSCCH is allocated. That is, a DMRS for PSSCH may not be allocated. On the contrary, (D) of FIG. 8 corresponds to type 3-2 in which a DMRS for PSSCH and PSSCH may be allocated to an area aside from the frequency domain to which the PSCCH is allocated. Here, a DMRS for PSSCH may be allocated only to a single symbol and thus, a DMRS for PSSCH and PSSCH may be allocated to only one of two symbols to which the PSCCH is allocated. Here, a method of configuring a DMRS for PSCCH and a DMRS for PSSCH may be required based on the aforementioned allocation methods, which is further described below.

Also, for example, considering the aforementioned type 3-1 of (C) of FIG. 8 and type 3-2 of (D) of FIG. 8, a PSSCH DMRS may be allocated from a first symbol in the case of the type 3-2 of (D) of FIG. 8. Therefore, fast demodulation may be performed for the PSSCH. Also, for example, considering the aforementioned type 3-1 of (C) of FIG. 8 and type 3-2 of (D) of FIG. 8, resources for the PSSCH DMRS may share resources for a PSCCH DMRS in the case of type 3-2 of (D) of FIG. 8. Therefore, resources for the PSSCH DMRS may be saved. As another example, in the case of allocation based on a non-slot, a DMRS allocation may be efficient for the type 3-2 of (D) of FIG. 8. However, it is provided as an example only and the present disclosure is not limited thereto. For example, a non-slot may refer to a slot having a number of symbols less by at least one symbol than that of a normal slot. In the aforementioned case, the DMRS allocation may be efficient. For example, in the case of two symbols as a non-slot, the DMRS allocation may be required based on the aforementioned type 3-2.

Also, FIG. 9 illustrates an example of a method in which a DMRS for PSCCH is configured using a single symbol and a DMRS for PSSCH is set based on "front-loaded DMRS" using two symbols. For example, referring to FIG. 9, a different allocation type may be set depending on whether a frequency domain to which the PSCCH is allocated is identical to a frequency domain to which the PSSCH is allocated. Here, (A) of FIG. 9 corresponds to type 1 in which the frequency domain to which the PSCCH is allocated may differ from the frequency domain to which the PSSCH is allocated. On the contrary, (B) of FIG. 9 corresponds to type 2 in which the frequency domain to which the PSCCH is allocated may be identical to the frequency domain to which the PSSCH is allocated. Also, for example, in the case of type 1, another frequency domain excluding the frequency domain to which the PSCCH is allocated is empty or another channel may be allocated thereto. On the contrary, (C) and (D) of FIG. 9 correspond to type 3 in which the PSSCH may be additionally allocated to the empty space aside from the frequency domain to which the PSCCH is allocated. That is, data may be transmitted through the empty space aside from the frequency domain to which the PSCCH is allocated. For example, (C) of FIG. 9 corresponds to type 3-1 in which only the PSSCH may be allocated to an area aside from the frequency domain to which the PSCCH is allocated. That is, a DMRS for PSSCH may not be allocated. On the contrary, (D) of FIG. 9 corresponds to type 3-2 in which a DMRS for PSSCH and PSSCH may be allocated to an area aside from the frequency domain to which the PSCCH is allocated. Here, a DMRS for PSSCH may be allocated only to two symbols and thus, may be allocated to a symbol to which the PSCCH is allocated and then a subsequent symbol. Here, a method of configuring a DMRS for PSCCH and a DMRS for PSSCH may be required based on the aforementioned allocation methods, which is further described below.

Also, for example, considering the aforementioned type 3-1 of (C) of FIG. 9 and type 3-2 of (D) of FIG. 9, a PSSCH DMRS may be allocated from a first symbol in the case of the type 3-2 of (D) of FIG. 9. Therefore, fast demodulation may be performed for the PSSCH. Also, for example, considering the aforementioned type 3-1 of (C) of FIG. 9 and type 3-2 of (D) of FIG. 9, resources for the PSSCH DMRS may share resources for a PSCCH DMRS in the case of type 3-2 of (D) of FIG. 9. Therefore, resources for the PSSCH DMRS may be saved. As another example, in the case of allocation based on a non-slot, a DMRS allocation may be efficient for the type 3-2 of (D) of FIG. 9. However, it is provided as an example only and the present disclosure is not limited thereto. For example, a non-slot may refer to a slot having a number of symbols less by at least one symbol than that of a normal slot. In the aforementioned case, the DMRS allocation may be efficient. For example, in the case of two symbols as a non-slot, the DMRS allocation may be required based on the aforementioned type 3-2.

Figure 10:
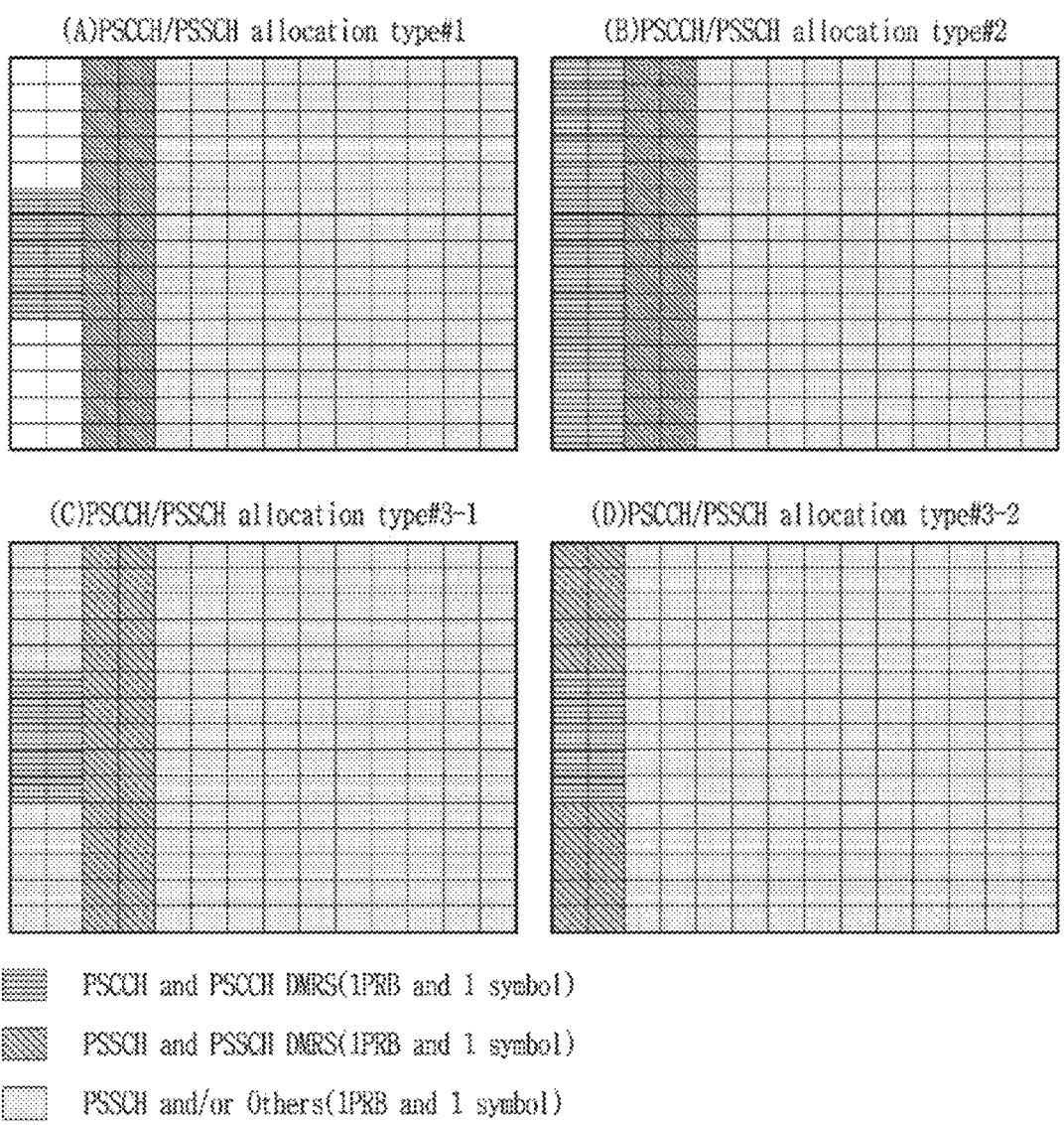
FIG. 10 illustrates an example of a method of allocating a PSCCH and a PSSCH according to the present disclosure.

Also, FIG. 10 illustrates an example of a method in which a DMRS for PSCCH is configured using two symbols and a DMRS for PSSCH is set based on "front-loaded DMRS" using two symbols. For example, referring to FIG. 10, a different allocation type may be set depending on whether a frequency domain to which the PSCCH is allocated is identical to a frequency domain to which the PSSCH is allocated. Here, (A) of FIG. 10 corresponds to type 1 in which the frequency domain to which the PSCCH is allocated may differ from the frequency domain to which the PSSCH is allocated. On the contrary, (B) of FIG. 10 corresponds to type 2 in which the frequency domain to which the PSCCH is allocated may be identical to the frequency domain to which the PSSCH is allocated. Also, for example, in the case of type 1, another frequency domain excluding the frequency domain to which the PSCCH is allocated is empty or another channel may be allocated thereto. On the contrary, (C) and (D) of FIG. 10 correspond to type 3 in which the PSSCH may be additionally allocated to the empty space aside from the frequency domain to which the PSCCH is allocated. That is, data may be transmitted through the empty space aside from the frequency domain to which the PSCCH is allocated. For example, (C) of FIG. 10 corresponds to type 3-1 in which only the PSSCH may be allocated to an area aside from the frequency domain to which the PSCCH is allocated. That is, a DMRS for PSSCH may not be allocated. On the contrary, (D) of FIG. 10 corresponds to type 3-2 in which a DMRS for PSSCH and PSSCH may be allocated to an area aside from the frequency domain to which the PSCCH is allocated. Here, a method of configuring a DMRS for PSCCH and a DMRS for PSSCH may be required based on the aforementioned allocation methods, which is further described below.

Also, for example, considering the aforementioned type 3-1 of (C) of FIG. 10 and type 3-2 of (D) of FIG. 10, a PSSCH DMRS may be allocated from a first symbol in the case of the type 3-2 of (D) of FIG. 10. Therefore, fast demodulation may be performed for the PSSCH. Also, for example, considering the aforementioned type 3-1 of (C) of FIG. 10 and type 3-2 of (D) of FIG. 10, resources for the PSSCH DMRS may share resources for a PSCCH DMRS in the case of type 3-2 of (D) of FIG. 10. Therefore, resources for the PSSCH DMRS may be saved. As another example, in the case of allocation based on a non-slot, a DMRS allocation may be efficient for the type 3-2 of (D) of FIG. 10. However, it is provided as an example only and the present disclosure is not limited thereto. For example, a non-slot may refer to a slot having a number of symbols less by at least one symbol than that of a normal slot. In the aforementioned case, the DMRS allocation may be efficient. For example, in the case of two symbols as a non-slot, the DMRS allocation may be required based on the aforementioned type 3-2.

A method of configuring a DMRS for PSCCH and a DMRS for PSSCH may be required for the embodiments of FIGS. 7 to 10. For example, a PSCCH DMRS and a PSCCH DMRS may be separately configured. Here, in each of FIGS. 7 to 10, in the case of type 1, type 2, and type 3-1, the DMRS for PSCCH and the DMRS for PSSCH are not allocated to the same symbol and thus, the DMRS for PSCCH and the DMRS for PSSCH may be separately configured and applied.

In detail, referring to FIG. 11, when the PSCCH DMRS and the PSCCH DMRS are separately configured, a PSCCH DMRS allocation pattern may be configured as a fixed pattern. Here, for example, referring to Table 19, the PSCCH DMRS allocation pattern may be allocated at a fixed location based on PUCCH format 2. However, it is provided as an example only and thus, the PSCCH DMRS allocation pattern may be configured as a fixed pattern based on another method. Here, as described above, a DMRS may be set using a method of distinguishing an antenna port. For example, a case of not supporting MIMO in NR V2X may be considered. For example, a case of not considering SU-MIMO may be considered as an example. Here, "[+1, +1, +1, +1]" may be set as an orthogonal sequence with respect to a total of four REs within the same symbol of a single PRB. That is, since there is no need to distinguish an antenna port with respect to the DMRS, the aforementioned value may be set to be alike as the orthogonal sequence.

On the contrary, for example, a case of supporting MIMO in NR V2X may be considered. For example, a case of supporting SU-MIMO may be considered as an example. Here, a case of supporting two antenna ports based on transmit diversity may be considered as an example. Here, in the case of a first antenna port, "[+1, +1, +1, +1]" may be set as an orthogonal sequence with respect to a total of four REs within the same symbol of a single PRB to distinguish antenna ports. Also, in the case of a second antenna port, "[+1, −1, +1, −1]" may be set as an orthogonal sequence with respect to a total of four REs within the same symbol of a single PRB to distinguish antenna ports. That is, two types of orthogonal sequences may be set to distinguish two antenna ports.

On the contrary, a PSSCH DMRS allocation pattern may consider the aforementioned DMRS configuration type 2. Here, the PSSCH DMRS allocation pattern may be determined based on an ID value. Here, the ID value may be a sidelink control information (SCI) ID. Also, the ID value may be a different ID value. However, it is provided as an example only and the present disclosure is not limited thereto. Meanwhile the SCI ID may be verified through the PSCCH. That is, the SCI ID may be included in the PSCCH and thereby transmitted.

Here, for example, the SCI ID may be an ID that is set in a physical (PHY) layer based on unicast or groupcast transmission (e.g., sidelink layer-1 (SL Layer-1) ID). Here, for example, in the NR V2X, the SL Layer-1 ID may be set to guarantee the reliability of NR V2X communication and to meet the low latency requirements based on unicast or groupcast. For example, in LTE V2X, only broadcast transmission is supported. Therefore, an SL Layer-1 ID value may be determined based on 16-bit cyclic redundancy code (CRC) information attached to SCI in the PSCCH and thereby used. Also, for example, in LTE D2D, an SL Layer-1

ID value may be used in a PHY channel based on a destination ID (for layer-1) provided from a transmitting UE to a receiving UE in SCI. Here, in the NR V2X, a plurality of unicasts and/or groupcasts may be present, which differs from the existing scenarios. Also, in the NR V2X, there is a need to support data transmission having high quality of service (QoS) requirements in a PHY layer. Here, to meet the QoS requirements, information, such as Hybrid Automatic Repeat Request (HARQ), Channel State Information (CSI), may be required based on link adaptation. Also, for example, another operation may be required to meet the QoS requirements. However, it is provided as an example only and the present disclosure is not limited thereto. Here, an SL Layer-1 ID needs to be set for SL unicast or groupcast transmission considering the aforementioned operations. That is, a UE may additionally perform unicast or groupcast transmission with existing broadcast-based SL transmission. Also, for example, traffic that requires high reliability and latency may be used for unicast transmission. In the case of providing a V2X service, many UE pairs for unicast may be present. Here, as described above, since various types of SL communications need to meet higher QoS requirements in the limited communication range, reliable transmission may be required even in the PHY layer.

Considering the above description, an SL Layer-1 ID value may be defined and used. For example, an SL Layer-1 ID may be determined based on at least one of "layer-1 destination ID", "layer-1 source ID", "HARQ process ID", and "CRC bits of associated PSCCH". Also, for example, the SL Layer-1 ID may be set as a layer-1 link ID through combination of at least two of "layer-1 destination ID", "layer-1 source ID", "HARQ process ID", and "CRC bits of associated PSCCH". As another example, the layer-1 link ID may be set as a portion of a layer-2 link ID. For example, the layer-2 link ID may be generated in response to establishment of a unicast and/or groupcast session. Here, the layer-1 link ID may be generated and set as a portion of the layer-2 link ID. However, it is provided as an example only and the present disclosure is not limited thereto.

That is, an SL Layer-1 ID for a PHY layer may be set and the SL Layer-1 ID may be an SCI ID. Hereinafter, description is made by referring the aforementioned ID as the SCI ID.

That is, the SCI ID may refer to the SL Layer-1 ID for the PHY layer, however, a setting method thereof is not limited thereto.

Here, a PSSCH DMRS allocation pattern may be configured to be different depending on whether MIMO is supported in the NR V2X. For example, a case of not supporting MIMO in the NR V2X may be considered. For example, a case of not considering SU-MIMO may be considered. Here, referring to FIG. 11, if MIMO is not supported, a DMRS pattern may be determined based on one of the following Table 20 to Table 22.

[Table 20]
If (SCI ID)mod3=0, use type A of FIG. 11
   use orthogonal sequence [+1, +1]
If (SCI ID)mod3=1, use type B of FIG. 11
   use orthogonal sequence [+1, +1]
If (SCI ID)mod3=2, use type C of FIG. 11
   use orthogonal sequence [+1, +1]
[Table 21]
If (SCI ID)mod3=0, use type A of FIG. 11
   If an integer part value of ((SCI ID)/3)=even number (=(int((SCI ID)/3)mod2=0)
     >use orthogonal sequence [+1, +1]
   If an integer part value of ((SCI ID)/3)=odd number (=(int((SCI ID)/3)mod2=1)
     >use orthogonal sequence [+1, −1]
If (SCI ID)mod3=1, use type B of FIG. 11
   If an integer part value of ((SCI ID)/3)=even number (=(int((SCI ID)/3)mod2=0)
     >use orthogonal sequence [+1, +1]
   If an integer part value of ((SCI ID)/3)=odd number (=(int((SCI ID)/3)mod2=1)
     >use orthogonal sequence [+1, −1]
If (SCI ID)mod3=2, use type C of FIG. 11
   If an integer part value of ((SCI ID)/3)=even number (=(int((SCI ID)/3)mod2=0)
     >use orthogonal sequence [+1, +1]
   If an integer part value of ((SCI ID)/3)=odd number (=(int((SCI ID)/3)mod2=1)
     >use orthogonal sequence [+1, −1]
[Table 22]
If int ((SCI ID)/2)mod3=0, use type A of FIG. 11
   If (SCI ID)mod2=0: use orthogonal sequence [+1, +1]
   If (SCI ID)mod2=1: use orthogonal sequence [+1, −1]
If int ((SCI ID)/2)mod3=1, use type B of FIG. 11
   If (SCI ID)mod2=0: use orthogonal sequence [+1, +1]
   If (SCI ID)mod2=1: use orthogonal sequence [+1, −1]
If int ((SCI ID)/2)mod3=2, use type C of FIG. 11
   If (SCI ID)mod2=0: use orthogonal sequence [+1, +1]
   If (SCI ID)mod2=1: use orthogonal sequence [+1, −1]

On the contrary, for example, a case of supporting MIMO in the NR V2X may be considered. For example, a case of considering SU-MIMO may be considered. Here, a case of supporting two antenna ports based on transmit diversity may be considered as an example. Here, to distinguish antenna ports, a first antenna port and a second antenna port may be distinguished based on orthogonal sequences of the following Table 23.

[Table 23]
If (SCI ID)mod3=0, use type A of FIG. 11
   for first antenna port: use orthogonal sequence [+1, +1]
   for second antenna port: use orthogonal sequence [+1, −1]
If (SCI ID)mod3=1, use type B of FIG. 11
   for first antenna port: use orthogonal sequence [+1, +1]
   for second antenna port: use orthogonal sequence [+1, −1]
If (SCI ID)mod3=2, use type C of FIG. 11
   for first antenna port: use orthogonal sequence [+1, +1]
   for second antenna port: use orthogonal sequence [+1, −1]

A case in which a DMRS is allocated to a single symbol is described above with reference to FIG. 11 and Table 20 to Table 23. Here, for example, the aforementioned allocation method described above with reference to FIG. 11 and Table 20 to Table 23 may apply alike to a case in which a DMRS is allocated to two symbols. That is, if a number of symbols is two, a DMRS allocation may be repeated and the present disclosure is not limited thereto.

Here, for example, when a PSCCH DMRS and a PSSCH DMRS are separately configured, a DMRS sequence may be determined according to the following Equation 3. For example, the PSCCH DMRS may be consecutively allocated to PRBs to which a PSCCH is allocated with respect to each symbol. Here, for example, an initialization value $c_{init}$ may be represented by the following Equation 4. Here, $N_{ID}^0$ may be indicated through RRC signaling. On the contrary, for example, if $N_{ID}^0$ is not indicated through RRC signaling, a fixed value may be used.

$$\gamma(n) = \frac{1}{\sqrt{2}}(1 - 2 \cdot c(2n)) + j\frac{1}{\sqrt{2}}(1 - 2 \cdot c(2n+1))$$ [Equation 3]

$$c_{init} = (2^{17}(14n_{s,f}^\mu + l + 1)(2N_{ID}^0 + 1) + 2N_{ID}^0) \bmod 2^{31}$$ [Equation 4]

$N_{ID}^0 \in \{0, 1, 2, \ldots, 65535\}$: by RRC if signaled, else fixed value

Also, an allocation location for a PSSCH DMRS may vary and an initialization value $c_{init}$ may be represented by the following Equation 5. Here, for example, the PSSCH DMRS may be consecutively allocated to PRBs to which a PSSCH is allocated with respect to each symbol. Here, $N_{ID}^{nSCID}$ may be indicated through RRC signaling. On the contrary, for example, if $N_{ID}^{nSCID}$ is not indicated through RRC signaling, an SCI ID may be used as described above.

Through this, a DMRS allocation pattern may be indicated. Also, if signaling is present, $n_{SCID}$ may be indicated through an SCI field. On the contrary, if signaling is absent, $n_{SCID}$ may be set to 0. However, it is provided as an example only and the present disclosure is not limited thereto.

$$c_{init} = (2^{17}(N_{symb}^{slot} n_{s,f}^\mu + l + 1)(2N_{ID}^{nSCID} + 1) + 2N_{ID}^{nSDID} + n_{SDID}) \bmod 2^{31}$$ [Equation 5]

$N_{ID}^{nSCID} \in \{0, 1, 2, \ldots, 65535\}$: by RRC if signaled, else SCI ID $n_{SCID}$: by SCI field if signaled, else 0

As another example, a case of simultaneously configuring a PSCCH DMRS and a PSSCH DMRS may be configured. For example, in each of FIGS. 7 to 10, a case of type 3-2 may be considered. That is, if the PSCCH DMRS and the PSSCH DMRS are allocated to the same symbol, the PSCCH DMRS and the PSSCH DMRS may be simultaneously configured. Here, a method of simultaneously configuring the PSCCH DMRS and the PSSCH DMRS may apply alike to type 1, type 2, and type 3-1 in each of FIG. 7 to FIG. 10, without excluding the aforementioned types.

Here, considering type 3-2 in each of FIGS. 7 to 10, a UE may initially partially demodulate the PSCCH DMRS and then may demodulate the PSCCH. Here, information about a pattern of the PSCCH DMRS may be preset. Also, for example, information about a pattern of the PSCCH DMRS may be indicated in advance through signaling. Here, since an SCI ID is information included in the PSCCH, the UE may be aware of the SCI ID by demodulating the PSCCH. The PSSCH may be estimated through a DMRS sequence consecutively allocated by considering all of a PSCCH DMRS portion and a PSSCH DMRS portion. As described above, the UE may verify a DMRS allocation pattern through the SCI ID and the PSSCH may be demodulated through the DMRS sequence consecutively allocated by considering all of the PSCCH DMRS portion and the PSSCH DMRS portion based on the verified DMRS allocation pattern. That is, the UE may perform demodulation through two stages. Here, since the PSCCH DMRS pattern is a fixed pattern, the UE may not perform blind decoding and may perform demodulation of the PSSCH through the aforementioned two-stage demodulation.

Here, for example, as described above with FIG. 11, although PSCCH DMRS overhead may be identical to PSSCH DMRS overhead, the PSCCH DMRS pattern may differ from the PSSCH DMRS pattern. That is, the PSCCH DMRS pattern is a fixed pattern and thus, may be set to differ from the PSSCH DMRS pattern. For example, a PSCCH DMRS allocation pattern is a fixed pattern and thus, an orthogonal sequence "[+1, +1, +1, +1]" may be set to a total of four REs within the same symbol of a single PRB if MIMO is not considered, which is described above. On the contrary, if two antenna patterns are set for the PSCCH DMRS allocation pattern by considering the MIMO, a first antenna port may be set as an orthogonal sequence "[+1, +1, +1, +1]" with respect to a total of four REs within the same symbol of a single PRB. Also, a second antenna port may be set as an orthogonal sequence "[+1, −1, +1, −1]" with respect to a total of four REs within the same symbol of a single PRB. That is, antenna ports may be distinguished through the orthogonal sequence, which is described above.

Also, as described above, a PSSCH DMRS allocation pattern may be set to be different depending on whether MIMO is supported in the NR V2X. For example, a case of not supporting MIMO in the NR V2X may be considered. Here, referring to FIG. 11, if the MIMO is not supported, a DMRS pattern may be determined based on one of the following Table 24 to Table 26.

[Table 24]

If (SCI ID)mod3=0, use type A of FIG. 11
    use orthogonal sequence [+1, +1]
If (SCI ID)mod3=1, use type B of FIG. 11
    use orthogonal sequence [+1, +1]
If (SCI ID)mod3=2, use type C of FIG. 11
    use orthogonal sequence [+1, +1]

[Table 25]

If (SCI ID)mod3=0, use type A of FIG. 11
    If an integer part value of ((SCI ID)/3)=even number (=int((SCI ID)/3)mod2=0)
        >use orthogonal sequence [+1, +1]
    If an integer part value of ((SCI ID)/3)=odd number (=int((SCI ID)/3)mod2=1)
        >use orthogonal sequence [+1, −1]
If (SCI ID)mod3=1, use type B of FIG. 11
    If an integer part value of ((SCI ID)/3)=even number (=int((SCI ID)/3)mod2=0)
        >use orthogonal sequence [+1, +1]
    If an integer part value of ((SCI ID)/3)=odd number (=int((SCI ID)/3)mod2=1)
        >use orthogonal sequence [+1, −1]
If (SCI ID)mod3=2, use type C of FIG. 11
    If an integer part value of ((SCI ID)/3)=even number (=int((SCI ID)/3)mod2=0)
        >use orthogonal sequence [+1, +1]
    If an integer part value of ((SCI ID)/3)=odd number (=int((SCI ID)/3)mod2=1)
        >use orthogonal sequence [+1, −1]

[Table 26]

If int ((SCI ID)/2)mod3=0, use type A of FIG. 11
    If (SCI ID)mod2=0: use orthogonal sequence [+1, +1]
    If (SCI ID)mod2=1: use orthogonal sequence [+1, −1]
If int ((SCI ID)/2)mod3=1, use type B of FIG. 11
    If (SCI ID)mod2=0: use orthogonal sequence [+1, +1]
    If (SCI ID)mod2=1: use orthogonal sequence [+1, −1]
If int ((SCI ID)/2)mod3=2, use type C of FIG. 11
    If (SCI ID)mod2=0: use orthogonal sequence [+1, +1]
    If (SCI ID)mod2=1: use orthogonal sequence [+1, −1]

On the contrary, for example, a case of supporting MIMO in the NR V2X may be considered. For example, a case of considering SU-MIMO may be considered. Here, a case of supporting two antenna ports based on transmit diversity may be considered as an example. Here, as described above, to distinguish antenna ports, a first antenna port and a second antenna port may be distinguished based on orthogonal sequences of the following Table 27.

[Table 27]
If (SCI ID)mod3=0, use type A of FIG. 11
  for first antenna port: use orthogonal sequence [+1, +1]
  for second antenna port: use orthogonal sequence [+1, −1]
If (SCI ID)mod3=1, use type B of FIG. 11
  for first antenna port: use orthogonal sequence [+1, +1]
  for second antenna port: use orthogonal sequence [+1, −1]
If (SCI ID)mod3=2, use type C of FIG. 11
  for first antenna port: use orthogonal sequence [+1, +1]
  for second antenna port: use orthogonal sequence [+1, −1]

Figure 12:
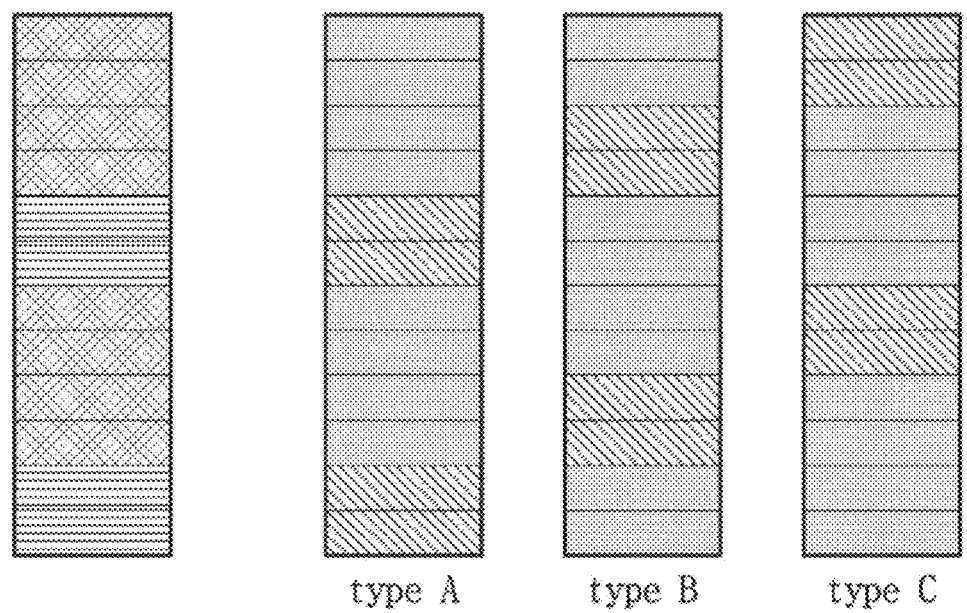
FIG. 12 illustrates an example of a PSCCH DMRS allocation pattern and a PSSCH DMRS allocation pattern according to the present disclosure.

Also, for example, referring to FIG. 12, a PSCCH DMRS pattern and a PSSCH DMRS pattern may be identical to each other. Here, comparing the PSCCH DMRS pattern of FIG. 12 and the PSCCH DMRS pattern of FIG. 11, in the case of applying an OCC, the PSCCH DMRS pattern of FIG. 12 may be effective. That is, since OCC application may be more suitable for an adjacent DMRS, the PSCCH DMRS pattern of FIG. 12 may be effective. Referring to FIG. 12, the PSCCH DMRS pattern, as a fixed pattern, may be set to be identical to the PSSCH DMRS pattern. For example, as described above, a PSCCH DMRS allocation pattern is a fixed pattern and thus, in the case of not considering MIMO, an orthogonal sequence "[+1, +1, +1, +1]" may be set to a total of four REs within the same symbol of a single PRB. On the contrary, if two antenna patterns are set for the PSCCH DMRS allocation pattern by considering the MIMO, a first antenna port may be set as an orthogonal sequence "[+1, +1, +1, +1]" with respect to a total of four REs within the same symbol of a single PRB. Also, a second antenna port may be set as an orthogonal sequence "[+1, −1, +1, −1]" with respect to a total of four REs within the same symbol of a single PRB. That is, antenna ports may be distinguished from each other through the orthogonal sequence, which is described above.

Also, as described, a PSSCH DMRS allocation pattern may be configured to be different depending on whether MIMO is supported in the NR V2X. For example, a case of not supporting MIMO in the NR V2X may be considered. Here, referring to FIG. 12, if the MIMO is not supported, a DMRS pattern may be determined based on one of the following Table 28 to Table 30.

[Table 28]
If (SCI ID)mod3=0, use type A of FIG. 12
  use orthogonal sequence [+1, +1]
If (SCI ID)mod3=1, use type B of FIG. 12
  use orthogonal sequence [+1, +1]
If (SCI ID)mod3=2, use type C of FIG. 12
  use orthogonal sequence [+1, +1]

[Table 29]
If (SCI ID)mod3=0, use type A of FIG. 12
  If an integer part value of ((SCI ID)/3)=even number (=(int((SCI ID)/3)mod2=0)
    >use orthogonal sequence [+1, +1]
  If an integer part value of ((SCI ID)/3)=odd number (=(int((SCI ID)/3)mod2=1)
    >use orthogonal sequence [+1, −1]
If (SCI ID)mod3=1, use type B of FIG. 12
  If an integer part value of ((SCI ID)/3)=even number (=(int((SCI ID)/3)mod2=0)
    >use orthogonal sequence [+1, +1]
  If an integer part value of ((SCI ID)/3)=odd number (=(int((SCI ID)/3)mod2=1)
    >use orthogonal sequence [+1, −1]
If (SCI ID)mod3=2, use type C of FIG. 12
  If an integer part value of ((SCI ID)/3)=even number (=(int((SCI ID)/3)mod2=0)
    >use orthogonal sequence [+1, +1]
  If an integer part value of ((SCI ID)/3)=odd number (=(int((SCI ID)/3)mod2=1)
    >use orthogonal sequence [+1, −1]

[Table 30]
If int ((SCI ID)/2)mod3=0, use type A of FIG. 12
  If (SCI ID)mod2=0: use orthogonal sequence [+1, +1]
  If (SCI ID)mod2=1: use orthogonal sequence [+1, −1]
If int ((SCI ID)/2)mod3=1, use type B of FIG. 12
  If (SCI ID)mod2=0: use orthogonal sequence [+1, +1]
  If (SCI ID)mod2=1: use orthogonal sequence [+1, −1]
If int ((SCI ID)/2)mod3=2, use type C of FIG. 12
  If (SCI ID)mod2=0: use orthogonal sequence [+1, +1]
  If (SCI ID)mod2=1: use orthogonal sequence [+1, −1]

On the contrary, for example, a case of supporting the MIMO in the NR V2X may be considered. For example, a case of considering SU-MIMO may be considered. Here, a case of supporting two antenna ports based on transmit diversity may be considered as an example. Here, as described above, to distinguish antenna ports, a first antenna port and a second antenna port may be distinguished based on orthogonal sequences of the following Table 31.

[Table 31]
If (SCI ID)mod3=0, use type A of FIG. 12
  for first antenna port: use orthogonal sequence [+1, +1]
  for second antenna port: use orthogonal sequence [+1, −1]
If (SCI ID)mod3=1, use type B of FIG. 12
  for first antenna port: use orthogonal sequence [+1, +1]
  for second antenna port: use orthogonal sequence [+1, −1]
If (SCI ID)mod3=2, use type C of FIG. 12
  for first antenna port: use orthogonal sequence [+1, +1]
  for second antenna port: use orthogonal sequence [+1, −1]

Meanwhile, for example, a location of a PSCCH DMRS may vary, which differs from the aforementioned example. Here, considering type 3-2 in each of FIGS. 7 to 10, a PSCCH DMRS pattern location may vary into three types based on an SCI ID, which is similar to a PSSCH DMRS pattern. Channel estimation of the PSCCH and the PSSCH may be performed by simultaneously demodulating the PSCCH DMRS and the PSSCH DMRS. That is, since the PSCCH DMRS and the PSSCH DMRS are simultaneously demodulated, a demodulation may be performed at a time without performing the aforementioned two-stage demodulation. Here, the SCI ID is information included in the PSCCH and may not be verified by a UE. Therefore, blind decoding may be performed for the PSCCH DMRS. Also, for example, in the case of an SCI ID transmitted through the PSCCH, only an integer value of (SCI ID)/3 (i.e., int((SCI ID)/3)) may be transmitted and thus, a transmission bit value may be reduced.

Figure 13:
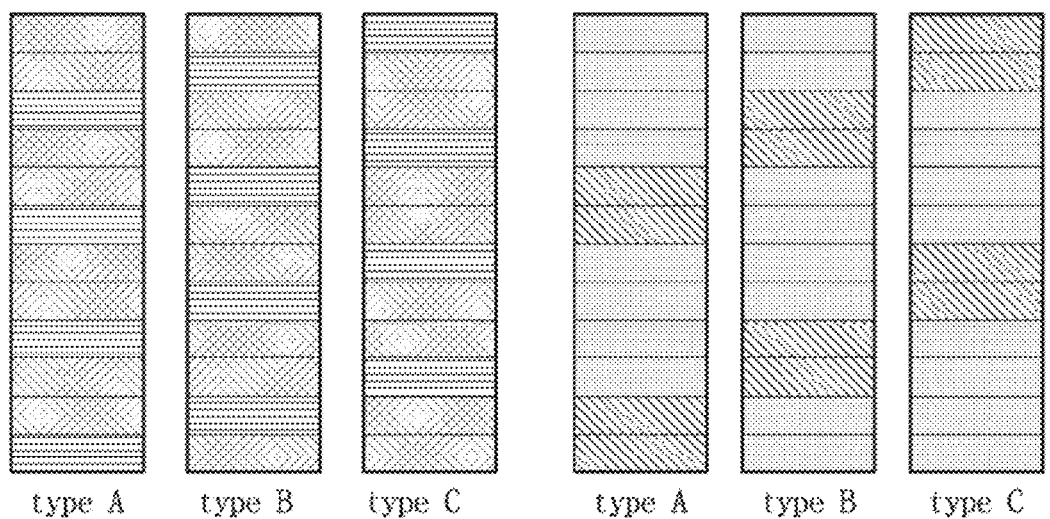
FIG. 13 illustrates an example of a PSCCH DMRS allocation pattern and a PSSCH DMRS allocation pattern according to the present disclosure.

Here, for example, referring to FIG. 13, as described above, a location of a PSCCH DMRS may vary, which is similar to a location of a PSSCH DMRS. However, a pattern of the PSCCH DMRS may differ from a pattern of the PSSCH DMRS. For example, overhead of the PSCCH DMRS may be identical to overhead of the PSSCH DMRS, however, patterns thereof may differ from each other. For example, to make overhead between the PSCCH and the PSSCH identical, a PSCCH DMRS location may be configured as shown in the following Table 32 and Table 33 by considering the aforementioned DMRS configuration type 2.

For example, Table 32 corresponds to a case of not considering MIMO and the orthogonal sequences may be set alike. On the contrary, Table 33 corresponds to a case of considering MIMO and may be a method based on a case in which two antenna ports are distinguished. Here, for example, in the case of considering SU-MIMO, only the PSSCH DMRS may consider the SU-MIMO. Here, for example, in the aforementioned case, the PSCCH DMRS may be allocated based on Table 32. However, it is provided as an example only and the present disclosure is not limited thereto

[Table 32]
If (SCI ID)mod3=0, use type A of FIG. 13,
  use orthogonal sequence [+1, +1]
If (SCI ID)mod3=1, use type B of FIG. 13,
  use orthogonal sequence [+1, +1]
If (SCI ID)mod3=2, use type C of FIG. 13,
  use orthogonal sequence [+1, +1]

[Table 33]
If (SCI ID)mod3=0, use type A of FIG. 13
  for first antenna port: use orthogonal sequence [+1, +1]
  for second antenna port: use orthogonal sequence [+1, −1]
If (SCI ID)mod3=1, use type B of FIG. 13
  for first antenna port: use orthogonal sequence [+1, +1]
  for second antenna port: use orthogonal sequence [+1, −1]
If (SCI ID)mod3=2, use type C of FIG. 13
  for first antenna port: use orthogonal sequence [+1, +1]
  for second antenna port: use orthogonal sequence [+1, −1]

Figure 14:
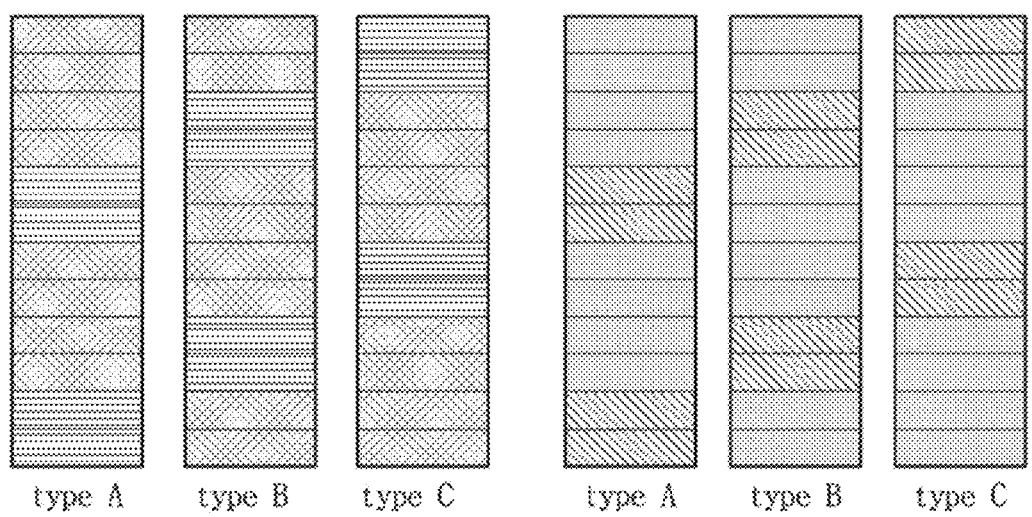
FIG. 14 illustrates an example of a PSCCH DMRS allocation pattern and a PSSCH DMRS allocation pattern according to the present disclosure.

As another example, referring to FIG. 14, as described above, a location of a PSCCH DMRS may vary, which is similar to a location of a PSSCH DMRS. A pattern of the PSCCH DMRS may be identical to a pattern of the PSSCH DMRS. Here, comparing the PSCCH DMRS pattern of FIG. 14 and the PSCCH DMRS pattern of FIG. 13, in the case of applying an OCC, the PSCCH DMRS pattern of FIG. 14 may be effective. That is, since OCC application may be more suitable for an adjacent DMRS, the PSCCH DMRS pattern of FIG. 14 may be effective. Also, the PSCCH DMRS pattern of FIG. 14 may be relatively excellent in terms of performance compared to FIG. 13 since DMRS sequences may be uniformly arranged compared to FIG. 13.

That is, referring to FIG. 14, the PSCCH DMRS pattern may be configured to be identical to the PSSCH DMRS pattern. Here, for example, to make overhead between the PSCCH and the PSSCH identical, a PSCCH DMRS location may be configured as shown in the following Table 34 and Table 35 by considering the aforementioned DMRS configuration type 2. For example, Table 34 corresponds to a case of not considering MIMO and the orthogonal sequences may be set alike. On the contrary, Table 35 corresponds to a case of considering MIMO and may be a method based on a case in which two antenna ports are distinguished. Here, for example, in the case of considering SU-MIMO, only the PSSCH DMRS may consider the SU-MIMO. Here, for example, in the aforementioned case, the PSCCH DMRS may be allocated based on Table 34. However, it is provided as an example only and the present disclosure is not limited thereto.

[Table 34]
If (SCI ID)mod3=0, use type A of FIG. 13
  use orthogonal sequence [+1, +1]
If (SCI ID)mod3=1, use type B of FIG. 13
  use orthogonal sequence [+1, +1]
If (SCI ID)mod3=2, use type C of FIG. 13
  use orthogonal sequence [+1, +1]

[Table 35]
If ((SCI ID)mod3=0, use type A of FIG. 13
  for first antenna port: use orthogonal sequence [+1, +1]
  for second antenna port: use orthogonal sequence [+1, −1]
If ((SCI ID)mod3=1, use type B of FIG. 13
  for first antenna port: use orthogonal sequence [+1, +1]
  for second antenna port: use orthogonal sequence [+1, −1]
If ((SCI ID)mod3=2, use type C of FIG. 13
  for first antenna port: use orthogonal sequence [+1, +1]
  for second antenna port: use orthogonal sequence [+1, −1]

Here, for example, in the case of simultaneously configuring a PSCCH DMRS and a PSSCH DMRS, a DMRS sequence may be determined according to the above Equation 3. For example, the PSCCH DMRS and the PSSCH DMRS may be consecutively allocated to all of PRBs to which PSCCH and/or PSSCH are allocated with respect to each symbol.

Here, for example, an initialization value $c_{init}$ may be represented by the following Equation 6. Here, $N_{ID}^{SLDMRS}$ may be indicated through RRC signaling. On the contrary, for example, if $N_{ID}^{SLDMRS}$ is not indicated through RRC signaling, a fixed value may be used. Here, for example, the fixed value may be a physical SL synchronization ID. Also, for example, the fixed value may be a value calculated (or acquired) from a layer-2 link ID. Also, the fixed value may be a value that may be verified by a UE in advance before PSCCH transmission. However, it is provided as an example only. That is, if the UE does not acquire information about $N_{ID}^{SLDMRS}$ through RRC signaling, the UE may use a preset fixed value. It is also provided as an example only and the present disclosure is not limited thereto. Also, for example, in the case of a slot-based allocation, $N_{symb}^{slot}=14$.

$$c_{init}=(2^{17}(N_{symb}^{slot}n_{s,f}^{\mu}+l+1)(2N_{ID}^{SLDMRS}+1)+2N_{ID}) \mod 2^{31} \quad \text{[Equation 6]}$$

Figure 15:
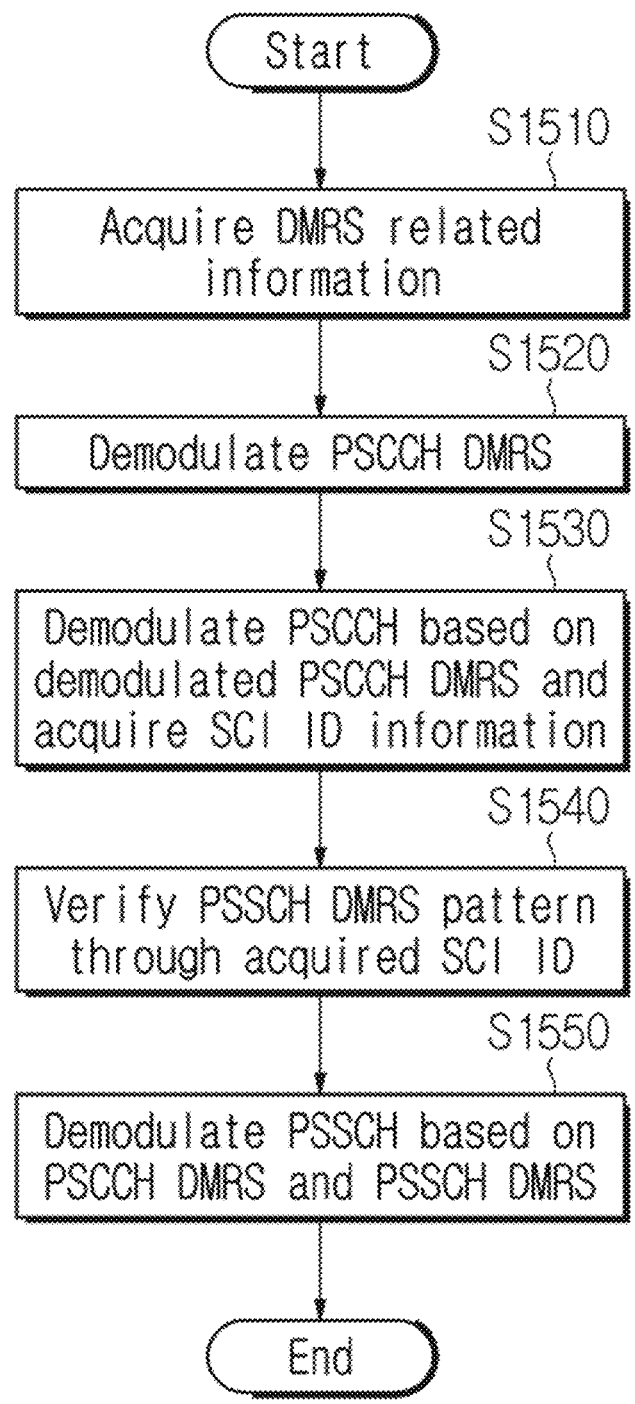
FIG. 15 illustrates an example in which a PSCCH DMRS and a PSSCH DMRS are simultaneously configured and a PSCCH DMRS pattern location is fixed according to the present disclosure.

$N_{ID}^{SLDMRS} \in \{0, 1, 2, \ldots, 65535\}$: by RRC if signaled, else fixed value $N_{symb}^{slot}=14$ if slot-based allocation FIG. 15 illustrates an example in which a PSCCH DMRS and a PSSCH DMRS are simultaneously configured and a PSCCH DMRS pattern location is fixed according to the present disclosure.

Referring to FIG. 15, in operation S1510, a UE may acquire DMRS related information for sidelink transmission. For example, the UE may acquire DMRS related information for sidelink transmission from a base station through RRC signaling or DCI. Also, for example, the DMRS related information may be preset to the UE. However, it is provided as an example only.

Here, if a PSCCH DMRS and a PSCCH DMRS are simultaneously configured and a PSSCH DMRS pattern location is fixed, the UE may initially demodulate the PSCCH DMRS in operation S1520. That is, similar to the aforementioned type 3-2 of FIGS. 7 to 10, if the PSCCH DMRS and the PSSCH DMRS are simultaneously configured and the PSSCH DMRS pattern location is fixed, the UE may initially demodulate the PSCCH DMRS. In operation S1530, the UE may demodulate the PSCCH based on the demodulated PSCCH DMRS and may acquire SCI ID information included in the PSCCH. The UE may receive the DMRS related information, may demodulate the PSCCH DMRS, and may acquire the SCI ID information from the PSCCH based thereon. Here, for example, as described above, a PSSCH DMRS allocation pattern may vary.

For example, the PSSCH DMRS allocation pattern may be set based on the aforementioned DMRS configuration type 2. However, it is provided as an example only. In operation S1540, the UE may verify the PSSCH DMRS pattern from the acquired SCI ID. That is, as described above, the PSSCH DMRS pattern may be set based on the SCI ID. In operation S1550, the UE may demodulate the PSSCH based on all of the PSCCH DMRS and the PSSCH DMRS. That is, the UE may perform channel estimation of the PSSCH through DMRS sequences consecutively allocated to all of a PSCCH DMRS portion and a PSSCH DMRS portion. As described above, the UE may perform a two-stage demodulation process.

Figure 16:
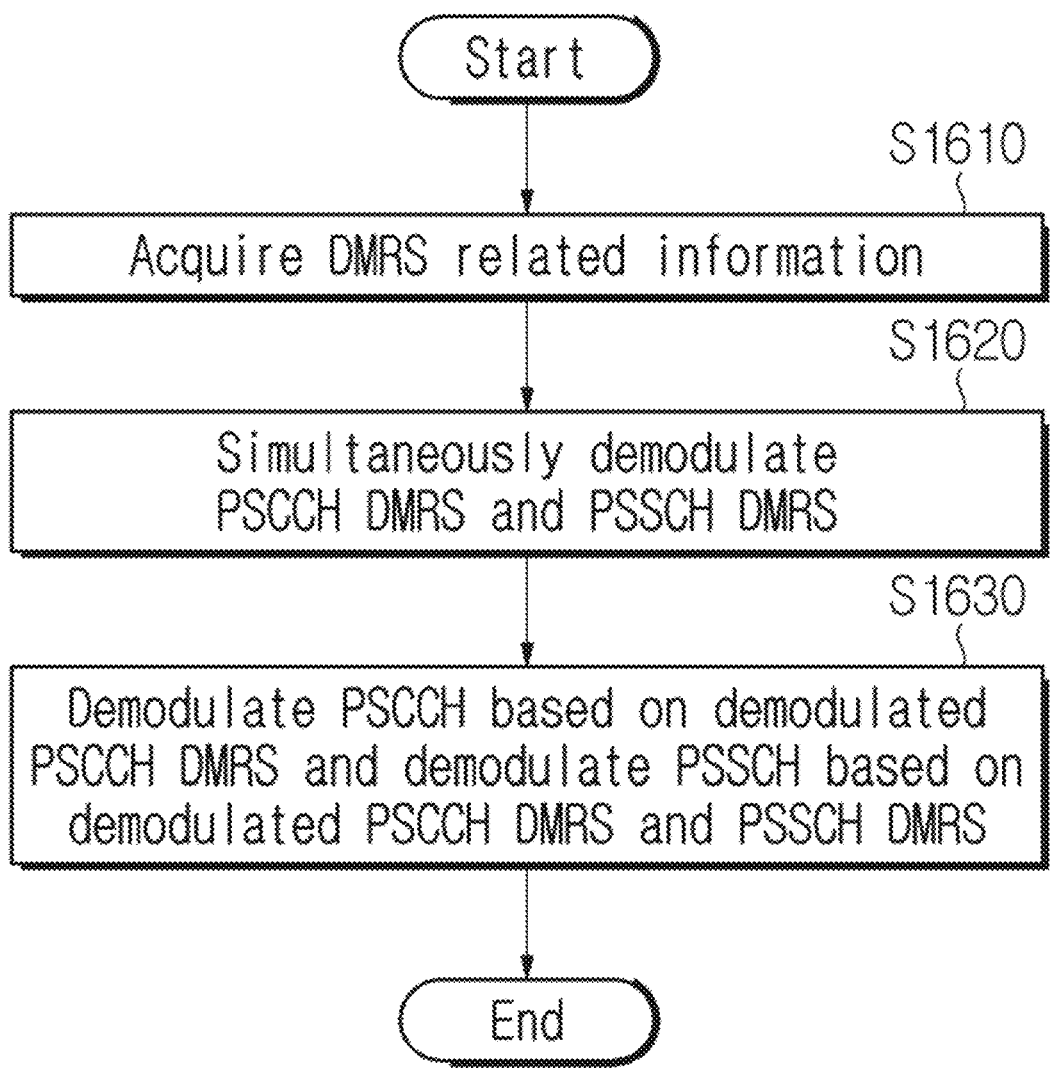
FIG. 16 illustrates an example in which a PSCCH DMRS and a PSSCH DMRS are simultaneously configured and a PSCCH DMRS pattern location varies according to the present disclosure.

FIG. 16 illustrates an example in which a PSCCH DMRS and a PSSCH DMRS are simultaneously configured and a PSCCH DMRS pattern location varies according to the present disclosure.

Referring to FIG. 16, in operation S1610, a UE may acquire DMRS related information for sidelink transmission. Here, the UE may acquire DMRS related information for sidelink transmission from a base station through RRC signaling or DCI. Also, for example, the DMRS related information may be preset to the UE. However, it is provided as an example only. Here, if a PSCCH DMRS and a PSCCH DMRS are simultaneously configured and a PSSCH DMRS pattern location varies, the UE may simultaneously demodulate the PSCCH DMRS and the PSSCH DMRS in operation S1620. Here, for example, as described above, an allocation pattern of the PSCCH DMRS may vary based on an SCI ID, which is similar to the PSSCH DMRS. Here, the UE may simultaneously demodulate the PSCCH DMRS and the PSSCH DMRS. As described above, since an allocation pattern of a PSCCH may vary, blind decoding may be required. In operation S1630, the UE may demodulate the PSCCH based on the demodulated PSCCH DMRS and may demodulate the PSSCH based on the PSCCH DMRS and the PSSCH DMRS.

FIG. 17 illustrates a configuration of a base station device and a terminal device according to the present disclosure.

Referring to FIG. 17, the base station device 1700 may include a processor 1710, an antenna device 1720, a transceiver 1730, and a memory 1740.

The processor 1710 may perform baseband-related signal processing and may include an upper layer processing 1711 and a physical (PHY) layer processing 1712. The upper layer processing 1711 may process an operation of a Medium Access Control (MAC) layer, a Radio Resource Control (RRC) layer, or more upper layers. The PHY layer processing 1712 may process an operation (e.g., uplink received signal processing, downlink transmission signal processing, sidelink transmission signal processing, and sidelink received signal processing) of a PHY layer. The processor 1710 may control the overall operation of the base station device 1700 in addition to performing the baseband-related signal processing.

The antenna device 1720 may include at least one physical antenna. If the antenna device 1720 includes a plurality of antennas, MIMO transmission and reception may be supported. The transceiver 1730 may include a radio frequency (RF) transmitter and an RF receiver. The memory 1740 may store operation processed information of the processor 1710 and software, an operating system (OS), an application, etc., associated with an operation of the base station device 1700, and may include a component such as a buffer.

The processor 1710 of the base station device 1700 may be configured to implement an operation of a base station (e.g., eNodeB) in the embodiments disclosed herein.

The terminal device 1750 may include a processor 1760, an antenna device 1770, a transceiver 1780, and a memory 1790. For example, communication between terminal devices may be performed based on sidelink communication herein. That is, herein, each terminal device 1750 performing sidelink communication may be a device that performs sidelink communication with the terminal device 1750 in addition to the base station device 1700. However, it is provided as an example only and the present disclosure is not limited thereto.

The processor 1760 may perform baseband-related signal processing and may include an upper layer processing 1761 and a PHY layer processing 1762. The upper layer processing 1761 may process an operation of a MAC layer, an RRC layer, or more upper layers. The PHY layer processing 1762 may process an operation (e.g., downlink received signal processing, uplink transmission signal processing, sidelink transmission signal processing, and sidelink received signal processing) of a PHY layer. The processor 1760 may control the overall operation of the terminal device 1750 may control the overall operation of the terminal device 1750 in addition to performing the baseband-related signal processing.

The antenna device 1770 may include at least one physical antenna. If the antenna device 1770 includes a plurality of antennas, MIMO transmission and reception may be supported. The transceiver 1780 may include an RF transmitter and an RF receiver. The memory 1790 may store operation processed information of the processor 1760 and software, an OS, an application, etc., associated with an operation of the terminal device 1750, and may include a component such as a buffer.

The processor 1760 of the terminal device 1750 may be configured to implement an operation of a terminal in the embodiments described herein.

The description made above in the examples of the present disclosure may apply alike to operations of the base station device 1700 and the terminal device 1750 and a further description related thereto is omitted.

While the exemplary method of the present invention is described as a series of operations, for clarity of description, this does not limit the order of steps. When needed, the steps may be performed at the same time or in a different order. In order to implement the method according to the present invention, the exemplary method may further include additional steps, include the remaining steps except for some steps, or may include additional steps other than some steps.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that operations of the method of the various examples may be executed on an apparatus or a computer, and a non-transitory computer-readable medium storing such software or instructions to be executable on an apparatus or a computer.

What is claimed is:

1. A method comprising:
receiving, by a first user device, information of a demodulation reference signal (DMRS) for vehicle-to-everything (V2X) communication between user devices;
via a first orthogonal frequency division multiplexing (OFDM) symbol in a first time interval, receiving, by the first user device from a second user device, a first Physical Sidelink Control Channel (PSCCH) DMRS and a first Physical Sidelink Shared Channel (PSSCH) DMRS;
demodulating, based on the first PSCCH DMRS, a first PSCCH;
demodulating, based on the first PSSCH DMRS, a first PSSCH;
receiving, via a second OFDM symbol in the first time interval, a second PSCCH DMRS, wherein the second OFDM symbol immediately follows the first OFDM symbol; and
receiving, via one or more third OFDM symbols in the first time interval, one or more second PSSCH demodulation reference signals (DMRSs), wherein the second OFDM symbol precedes the one or more third OFDM symbols.

2. The method of claim 1, further comprising:
receiving, via the first OFDM symbol in the first time interval, the first PSCCH and the first PSSCH,
wherein the first PSCCH DMRS and the first PSCCH are mapped in a first frequency band and in the first OFDM symbol, and
wherein the first PSSCH DMRS and the first PSSCH are mapped in a second frequency band and in the first OFDM symbol.

3. The method of claim 2, further comprising:
receiving, via the second OFDM symbol in the first time interval, a second PSCCH,
wherein the second PSCCH DMRS and the second PSCCH are mapped in the first frequency band and in the second OFDM symbol.

4. The method of claim 1, wherein the first time interval is a normal slot, and
wherein the normal slot consists of 14 OFDM symbols in a time axis.

5. The method of claim 1, wherein the first time interval is a non-slot or a mini-slot, and
wherein the non-slot or the mini-slot consists of less than 14 OFDM symbols in a time axis.

6. The method of claim 1, further comprising:
via a fourth OFDM symbol in a second time interval, receiving, by the first user device, a third PSCCH DMRS and a third PSSCH DMRS;
receiving, via a fifth OFDM symbol in the second time interval, a fourth PSCCH DMRS, wherein the fifth OFDM symbol immediately follows the fourth OFDM symbol; and
receiving, via one or more sixth OFDM symbols in the second time interval, one or more fourth PSSCH DMRSs, wherein the fifth OFDM symbol precedes the one or more sixth OFDM symbols.

7. The method of claim 1, wherein the first PSCCH DMRS is received via a first frequency resource in the first OFDM symbol, and
wherein the first PSSCH DMRS is received via a second frequency resource in the first OFDM symbol.

8. The method of claim 7, wherein a portion of the second frequency resource is configured in at least one of:
a frequency band lower than a frequency band of the first frequency resource; or
a frequency band higher than the frequency band of the first frequency resource.

9. The method of claim 1, wherein no channel configured in the first time interval precedes the first OFDM symbol.

10. The method of claim 1, further comprising determining, based on sidelink control information (SCI) identifier (ID) information comprised in the first PSCCH and the second PSCCH, the first PSSCH DMRS.

11. A method comprising:
transmitting, by a first user device, information of a demodulation reference signal (DMRS) for vehicle-to-everything (V2X) communication between user devices;
via a first orthogonal frequency division multiplexing (OFDM) symbol in a first time interval, transmitting, by the first user device to a second user device, a first Physical Sidelink Control Channel (PSCCH) DMRS and a first Physical Sidelink Shared Channel (PSSCH) DMRS, wherein the first PSCCH DMRS is for the second user device for demodulating a first PSCCH, and wherein the first PSSCH DMRS is for the second user device for demodulating a first PSSCH;
transmitting, via a second OFDM symbol in the first time interval, a second PSCCH DMRS, wherein the second OFDM symbol immediately follows the first OFDM symbol; and
transmitting, via one or more third OFDM symbols in the first time interval, one or more second PSSCH demodulation reference signals (DMRSs), wherein the second OFDM symbol precedes the one or more third OFDM symbols.

12. The method of claim 11, further comprising:
transmitting, via the first OFDM symbol in the first time interval, the first PSCCH and the first PSSCH,
wherein the first PSCCH DMRS and the first PSCCH are mapped in a first frequency band and in the first OFDM symbol, and
wherein the first PSSCH DMRS and the first PSSCH are mapped in a second frequency band and in the first OFDM symbol.

13. The method of claim 12, further comprising:
transmitting, via the second OFDM symbol in the first time interval, a second PSCCH,
wherein the second PSCCH DMRS and the second PSCCH are mapped in the first frequency band and in the second OFDM symbol.

14. The method of claim 11, wherein the first time interval is a normal slot, and
wherein the normal slot consists of 14 OFDM symbols in a time axis.

15. The method of claim 11, wherein the first time interval is a non-slot or a mini-slot, and
wherein the non-slot or the mini-slot consists of less than 14 OFDM symbols in a time axis.

16. The method of claim 11, further comprising:
via a fourth OFDM symbol in a second time interval, transmitting, by the first user device, a third PSCCH DMRS and a third PSSCH DMRS;

transmitting, via a fifth OFDM symbol in the second time interval, a fourth PSCCH DMRS, wherein the fifth OFDM symbol immediately follows the fourth OFDM symbol; and transmitting, via one or more sixth OFDM symbols in the second time interval, one or more fourth PSSCH DMRSs, wherein the fifth OFDM symbol precedes the one or more sixth OFDM symbols.

17. The method of claim 11, wherein the first PSCCH DMRS is transmitted via a first frequency resource in the first OFDM symbol, and wherein the first PSSCH DMRS is transmitted via a second frequency resource in the first OFDM symbol.

18. The method of claim 17, wherein a portion of the second frequency resource is configured in at least one of:

a frequency band lower than a frequency band of the first frequency resource; or a frequency band higher than the frequency band of the first frequency resource.

19. The method of claim 11, wherein no channel configured in the first time interval precedes the first OFDM symbol.

20. The method of claim 11, wherein the first PSCCH and the second PSCCH comprise sidelink control information (SCI) identifier (ID) information.

21. The method of claim 20, further comprising generating, based on the SCI ID information, the first PSSCH DMRS.

* * * * *